United States Patent
Jeong et al.

(10) Patent No.: US 9,491,246 B2
(45) Date of Patent: Nov. 8, 2016

(54) METHOD FOR MANAGING PERSONAL NETWORK

(71) Applicant: LG ELECTRONICS INC., Seoul (KR)

(72) Inventors: Seungmyeong Jeong, Anyang-si (KR); Younsung Chu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 14/360,875

(22) PCT Filed: Dec. 14, 2012

(86) PCT No.: PCT/KR2012/010916
§ 371 (c)(1),
(2) Date: May 27, 2014

(87) PCT Pub. No.: WO2013/089486
PCT Pub. Date: Jun. 20, 2013

(65) Prior Publication Data
US 2014/0330972 A1 Nov. 6, 2014

Related U.S. Application Data

(60) Provisional application No. 61/570,776, filed on Dec. 14, 2011, provisional application No. 61/623,576, filed on Apr. 13, 2012, provisional application No. 61/641,890, filed on May 3, 2012, provisional application No. 61/651,556, filed on May 25, 2012, provisional application No. 61/696,311, filed on Sep. 4, 2012.

(51) Int. Cl.
*G06F 15/173* (2006.01)
*H04L 29/08* (2006.01)
(Continued)

(52) U.S. Cl.
CPC .............. *H04L 67/16* (2013.01); *H04W 4/203* (2013.01); *H04L 63/10* (2013.01)

(58) Field of Classification Search
CPC ....... H04L 67/16; H04L 63/10; H04W 4/203
See application file for complete search history.

(56) References Cited

U.S. PATENT DOCUMENTS 9,071,590 B2 *  6/2015  Park ..................... H04L 12/2809
9,130,823 B2 *  9/2015  Park ........................ H04L 12/66
(Continued)

FOREIGN PATENT DOCUMENTS

CN        101299859 A      11/2008
CN        101489300 A       7/2009
(Continued)

OTHER PUBLICATIONS

"Converged Personal Network Service Core Technical Specification", May 3, 2011, Open Mobile Alliance, Candidate Version 1.0, pp. 37-94.*
(Continued)

*Primary Examiner* — Jonathan Bui
(74) *Attorney, Agent, or Firm* — Birch, Stewart, Kolasch & Birch, LLP

(57) ABSTRACT

Provided is a method for requesting to add an adminee and to assign a PN (personal network) admin and changing information about the adminee in a personal network (PN). The method may be initiated by a PN element which desires to be the PN admin and change the information about the adminee or a PN gateway in the PN. If the PN element initiates the method, the PN element can request assignment of the PN admin to a CPNS (converged personal network service) server when a result of requesting addition of the adminee for another PN element is successful. Also, the PN element which has become the PN admin can request change of specific information about the adminee to the CPNS server when a result of requesting to change the specific information from the adminee is successful.

16 Claims, 9 Drawing Sheets

(51) Int. Cl.
*H04W 4/20* (2009.01)
*H04L 29/06* (2006.01)

(56) References Cited

U.S. PATENT DOCUMENTS

| | | | |
|---|---|---|---|
| 2011/0090886 A1* | 4/2011 | Park | H04W 4/203 370/338 |
| 2011/0093704 A1 | 4/2011 | Park et al. | |
| 2011/0307620 A1* | 12/2011 | Park | H04L 12/2809 709/229 |
| 2012/0108267 A1* | 5/2012 | Yang | H04W 4/203 455/456.3 |
| 2012/0177056 A1* | 7/2012 | Park | H04L 12/2834 370/401 |
| 2013/0208626 A1* | 8/2013 | Lee | H04W 48/16 370/255 |

FOREIGN PATENT DOCUMENTS

| | | |
|---|---|---|
| EP | 2367370 A1 | 9/2011 |
| KR | 10-2011-0041995 A | 4/2011 |
| KR | 10-2011-0042711 A | 4/2011 |
| WO | WO 2010/050643 A1 | 5/2010 |

OTHER PUBLICATIONS

Open Mobile Alliance, "Converged Personal Network Service Core Technical Specification," Candidate Version 1.0, OMA-TS-CPNS_Core-V1_0-20110305-C, May 3, 2011, pp. 1-246.

Open Mobile Alliance, "Converged Personal Network Service Requirements," Candidate Version 1.0, OMA-RD-CPNS-V1_0-20110503-C, May 3, 2011, pp. 1-36.

* cited by examiner

METHOD FOR MANAGING PERSONAL NETWORK

CROSS REFERENCE TO RELATED APPLICATIONS

This application is a National Phase of International Application No. PCT/KR2012/010916 filed on Dec. 14, 2012, which claims priority to Provisional Application Nos. 61/570,776 filed on Dec. 14, 2011, 61/623,576 filed on Apr. 13, 2012, 61/641,890 filed on May 3, 2012, 61/651,556 filed on May 25, 2012 and 61/696,311 filed on Sep. 4, 2012, which are incorporated by references as if fully set forth herein.

TECHNICAL FIELD

The present invention relates to a converged personal network service (CPNS), and more particularly, to assignment and release of an admin for administering a personal network (PN) and an adminee when the PN for a CPNS is established, and administration of the PN via the admin and the adminee.

BACKGROUND ART

Among a variety of techniques, Digital Living Network Alliance (DLNA) or ZigBee focuses on service discovery and service use between devices within a specific Personal Area Network (PAN), whereas tethering focuses on connectivity between heterogeneous networks.

Unlike the simple PAN, the concept of CPNS has been introduced.

In the CPNS, devices can belong to a PN (or PAN) and receive various services.

The CPNS is implemented by a CPNS server, a CPNS GateWay (CPNS GW) (or a PN GateWay (PN GW)), and a CPNS device (or a PN Element (PNE)). Besides, a general server, general devices, etc. may exist for the CPNS.

The CPNS is provided based on a PN formed with a set of devices. A CPNS GW is deployed in the PN and services of the devices belonging to the PN are registered to the CPNS server through the CPNS GW. Thus a device that provides a specific service may be searched for in the CPNS server and an external device may share the specific service provided by the device based on the search.

The CPNS GW connects the PN to another network. A CPNS device is a member of the PN. One or more devices may form one PN.

FIG. 1 is an exemplary view illustrating the concept of the CPNS. A content server, a CPNS server, a PN GW, and PNEs are shown in FIG. 1.

The CPNS server may communicate with one or more PN GWs and may transmit data to or receive data from the PN GWs. The CPNS server may exchange data with one or more CPNS devices within PNs (or PANs) through the PN GWs by communication. Each of the PNEs may transmit data to or receive data from one or more other PNEs or general devices through a CPNS GW. A PN GW may transmit data to or receive data from the CPNS server, a PN GW belonging to another PN, or a PNE by communication.

The CPNS server may transmit data to or receive data from a general server and a PN GW by communication. For example, the CPNS server and the PN GW may communicate with each other through a cellular network and the PN GW and a PNE may communicate with each other by short-range communication such as Bluetooth, Near Field Communication (NFC), ZigBee, Wireless Fidelity (WiFi), etc.

The CPNS server may manage and control communication between a PN GW and a PNE. The resulting exchange of applications and information may increase user experience. For example, in FIG. 1, a user may acquire location information from another PNE (e.g., a Global Positioning System (GPS) receiver) through one of PNEs, for example, a PNE that does not have a location measurement function, may transmit the location information to the CPNS server through the PN GW, and may receive a location-based service from the CPNS server. In this manner, if there is a PNE having a function that another PNE does not have in the same PN, a user may receive various services through various PNEs of the PN by the CPNS.

The CPNS supports two models: a client-server model in which a server provides a service to a PNE under management of a CPNS server and a peer-to-peer model in which different PNs are combined.

In the client-server model that is basically considered, the coverage of a service provided to a mobile phone PN GW1 over a cellular network can be expanded to other devices PNE1 to PNE3 connected to PN GW1. The PNEs may receive various services provided by a content server (or an application server) through PN GW1.

In the related art, in order to change information about the established PN (e.g., PN information, PN GW information, PNE information), a procedure of releasing or generating the PN is used or, in case of PNE information, withdraw or subscription of a PNE from or to a PN is performed. This leads to a unnecessary PN release or generation procedure or PNE withdraw or subscription procedure and thus a service provided to the established PN is necessarily stopped, thereby leading to inconvenience of CPNS users and time delay. In particular, in case of PN information, a procedure of changing information at an entity belonging to the PN was impossible without a regeneration procedure after the PN has been released.

DISCLOSURE

Technical Problem

An object of the present invention devised to solve the problem lies in a process of introducing a PN admin which serves as an administrator in a personal network (PN) and a PN adminee administered by the PN admin and assigning the PN admin and the PN adminee and a method of administering a PN via the PN admin and the PN adminee and sharing information about the PN between entities of the PN.

The technical problems solved by the present invention are not limited to the above technical problems and other technical problems which are not described herein will become apparent to those skilled in the art from the following description.

Technical Solution

The object of the present invention can be achieved by providing a method for changing information about an adminee by a PN admin in a personal network (PN), the PN admin and the adminee belonging to the same user, the PN admin being authorized to administrate the information about the adminee belonging to the same user, and the method being performed by a PN gateway (GW), the method including transmitting, to an adminee candidate PN element (PNE), a first request message for requesting to add an adminee and to assign a PN admin, receiving, from the PNE, a first response message including a result of requesting to add the adminee, transmitting, to a converged personal network service (CPNS) server, a second request message equal to the first request message for requesting to assign the PN admin when the result of requesting to add the adminee is successful, receiving, from the CPNS server, a second response message including a result of requesting to assign the PN admin, updating a PN inventory with respect to addition of the adminee and assignment of the PN admin if the result of requesting to assign the PN admin is successful, transmitting, to the PNE, a third request message for requesting to change specific information about the adminee corresponding to a PN element (PNE) in the PN, the third request message including PN information or PNE information to be changed, receiving, from the PNE, a third response message including a result of requesting to change the specific information, transmitting, to the CPNS server, a fourth request message for requesting to change the specific information if the result of requesting to change the specific information is successful, receiving, from the CPNS server, a fourth response message including a result of requesting to change the specific information, and updating the PN inventory with the specific information to be changed when the result of requesting to change the specific information included in the fourth response message is successful.

Additionally or alternatively, the first request message may further include information indicating an adminee to be added.

Additionally or alternatively, when the PN GW, which has transmitted the third request message, corresponds to the PN admin of the PN, a PN inventory of the PNE may be updated, by the PNE, to the specific information.

Additionally or alternatively, when the fourth request message is received by the CPNS server, a PN inventory of the CPNS server may be updated to the specific information by the CPNS server.

Additionally or alternatively, when a PN admin does not exist in the PN and the PN GW has predetermined capabilities or more, the result of requesting to assign the PN admin may be set to "successful" by the CPNS server.

Additionally or alternatively, the method may further include transmitting, to a PNE to be added as an adminee, a fifth request message for requesting to add an adminee, receiving, from the PNE to be added, a fifth response message including a result of requesting to add the adminee, transmitting, to the CPNS server, a sixth request message equal to the fifth request message when the result of requesting to add the adminee is set to "successful", receiving, from the CPNS server, a sixth response message in response to the request message, and updating the PN inventory with respect to addition of the adminee when the result included in the sixth response message is set to "successful".

Additionally or alternatively, when the PN GW is a PN admin of the PN and the PNE, which has received the request message for requesting to add the adminee, accepts the request to add the adminee, the result of requesting to add the adminee may be set to "successful".

Additionally or alternatively, the method may further include transmitting, to PNEs of the PN, a notification message indicating the assignment of the PN admin, the addition of the adminee or the change of the information.

In another aspect of the present invention, provided herein is a method for changing information about an adminee by a PN admin in a personal network (PN), the PN admin and the adminee belonging to the same user, the PN admin being authorized to administrate the information about the adminee belonging to the same user, and the method being performed by a PN element (PNE), the method including transmitting, to a PN gateway (GW), a first request message for requesting to add an adminee and to assign a PN admin, receiving, from the PN GW, a first response message including a result of requesting to add the adminee and to assign the PN admin, updating a PN inventory with respect to addition of the adminee and assignment of the PN admin when the result of requesting to add the adminee and to assign the PN admin is successful, transmitting, to the PN GW, a second request message for requesting to change specific information about the adminee corresponding to the PN GW or another PNE of the PN, the second request message including PN information, PNE information or PN GW information to be changed, receiving, from the PN GW, a second response message including a result of requesting to change the specific information, and updating the PN inventory to the specific information when the result of requesting to change the specific information is successful.

Additionally or alternatively, the first request message may further include information indicating the adminee to be added.

Additionally or alternatively, when the second request message is received from the PNE and the PNE is a PN admin of the PN, a PN inventory of another PNE, which has received the second request message, may be updated to the specific information by the PN GW or another PNE.

Additionally or alternatively, when a PN admin does not exist in the PN and the PNE has predetermined capabilities or more, the result of requesting to assign the PN admin may be set to "successful" by a converged personal network service (CPNS) server.

Additionally or alternatively, the method may further include transmitting, to the PN GW, a third request message for requesting to add an adminee, the third request message including attributes indicating the adminee, receiving, from the PN GW, a third response message including a result of requesting to add the adminee, and updating the PN inventory with respect to addition of the adminee when the result of requesting to add the adminee is successful.

Additionally or alternatively, when the PNE is a PN admin of the PN and the PNE, which has received the request message for requesting to add the adminee, accepts the request to add the adminee, the result of requesting to add the adminee may be set to "successful".

Additionally or alternatively, the method may further include transmitting, to other PNEs of the PN, a notification message indicating the assignment of the PN admin, the addition of the adminee or the change of the information.

It is to be understood that both the foregoing general description and the following detailed description are merely exemplary of the invention, and are intended to provide an overview or framework for understanding the nature and character of the invention as it is claimed.

Advantageous Effects

In the related art, in order to change information about a personal network (PN), a PN release or generation procedure should be performed with respect to PN GWs and PNEs. However, in the embodiments of the present invention, it is possible to change PN, PN GW or PNE information without stopping a service of an established PN and without performing the PN release or generation procedure and to share the changed information between PN GWs or PNEs in the PN.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
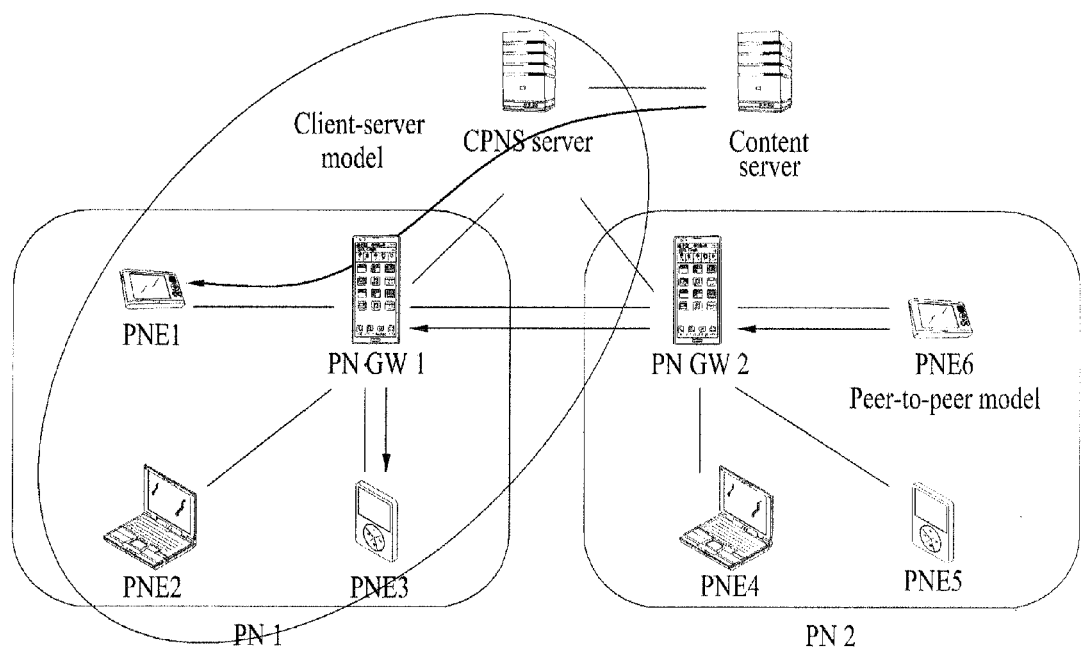
FIG. 1 is a diagram showing the concept of a converged personal network service (CPNS)

The present invention relates to a Converged Personal Network Service (CPNS). However, the present invention is not limited thereto and is applicable to any communication system and method to which the technical features of the present invention can be applied, and other systems.

The technical terms used in the present invention are provided simply to describe specific embodiments, not intended to restrict the present invention. Unless otherwise defined, all the technical terms used herein have the same meanings as terms generally understood by those skilled in the art. The terms should be interpreted as neither excessively comprehensive meanings nor excessively narrow meanings. If technical terms used in the specification are too wrongly chosen to accurately express the subject matter of the present invention, they should be replaced with ones readily understood to those skilled in the art. In addition, general terms used herein should be understood so as to have the same meanings as defined in a general dictionary or as contextual meanings of the related art. The terms should not be interpreted as excessively narrow meanings.

Herein, singular expressions include plural expressions unless otherwise clarified in the context. In this description, the term "comprise" or "include" is not interpreted as necessarily including all of the components or steps described in the specification. Rather, it should be understood that there are possibilities of omitting or adding one or more components or steps.

While ordinal numbers like first, second, etc. can be used to describe a number of components, these components are not limited by the terms. The terms are used only to distinguish one component from other components. For example, a first component may be referred to as a second component or vice versa within the scope and spirit of the present invention.

When it is said that one component is "connected" or "linked" to another component, they may be connected or linked directly or with a third component in between. On the other hand, if it is clarified that one component is "directly connected" or "directly linked" to another component, it should be understood that a third component is not interposed between the components.

Reference will now be made to preferred embodiments of the present invention with reference to the attached drawings. Like reference numerals denote the same or similar components and redundant descriptions of the components are avoided. A detailed description of known technologies will be omitted lest it should obscure the subject matter of the present invention. In addition, the attached drawings are provided to help easy understanding of the subject matter of the present invention, not limiting the present invention. The spirit of the present invention should be interpreted as expanding to all variations, equivalents, and replacements besides the attached drawings.

Various terminals or devices are shown in the drawings. The term terminal or device may be replaced with User Equipment (UE), Mobile Equipment (ME), Mobile Station (MS), User Terminal (UT), Subscriber Station (SS), wireless device, handheld device, or Access Terminal (AT). Further, the terminal or device may be a portable device equipped with communication capabilities, such as a portable phone, a Personal Digital Assistant (PDA), a smartphone, a wireless modem, a laptop computer, etc. or a non-portable device such as a Personal Computer (PC) or an in-vehicle device.

Some terms used herein will first be defined as follows.

DEFINITIONS OF TERMS

Before describing the present invention with reference to the attached drawings, terms used throughout the specification will be described in brief to help the understanding of the present invention.

1) CPNS: Devices belonging to a Personal Network (PN) (or Personal Area Network (PAN)) may receive various services by the CPNS. Compared to a tethering service in which a device connected to the Internet assigns a private Internet Protocol (IP) address to another device by Network Address Translation (NAT) so that the other device may access the Internet using the private IP address, the CPNS enables a first device of a user to manage various services available through a mobile communication network in an integrated manner, beyond simple allocation of a private IP address to another device. As the first device of the user manages various services in an integrated manner, a plurality of devices of the user may share the services seamlessly. For example, the first device of the user may transfer an ongoing Video On Demand (VOD) service to a second device without interruptions, thereby increasing user convenience. Further, if the user has a plurality of services and an external server is to transmit service data to the user without a request from the user, the external server may select one of the devices to which the service data is to be transmitted. For example, if the user has a plurality of devices capable of video calls and receives a video call request, which one of the devices to receive the video call may be determined. The ongoing video call may be transferred to another device of the user. The CPNS is implemented by a CPNS-enabled entity of a user device.

2) CPNS-enabled entity: A logical entity. There are three types of CPNS-enabled entities: PN Element (PNE), PN GateWay (PN GW), and CPNS server. The CPNS server is located within a core network and the PNE and the PN GW are located in CPNS devices.

3) CPNS device: A device that may operate simultaneously in a plurality of modes in a PN. The CPNS device has a function of processing, storing, and playing back content. In addition, the CPNS device may have a communication interface that enables different CPNS devices to operate in different modes in the PN.

4) CPNS server: A functional entity that can provide resources to CPNS entities upon request or in a push manner. The CPNS server registers devices and user-related services, stores corresponding information, and registers a PN being a group of devices and a service group covering a PN and a Wide Area Network (WAN). The CPNS server may communicate with an external entity such as a content server. To implement a service on a CPNS framework, the CPNS server configures a key for authenticating a device as owned by a user. In addition, the CPNS server registers an externally provided service and supports a discovery request and a consumption/providing request so that a device may consume a service.

5) PN: A collection of devices available to a user to consume or produce a service. All devices of the PN may be connected to a PN GW. The PN may vary over time. The PN may include a device operating in a PN GW mode and another device operating in a PNE mode.

6) PNE: The abbreviation of Personal Network Element. A PNE is a member of a PN. The PNE may consume or provide a service or content. The PNE actually consumes content, an application, and a service. The PNE is a member that forms a PN and a service group on a CPNS framework.

7) PN GW: The abbreviation of Personal Network Gateway. A PN GW is an entity located in a PN and a WAN. The PN GW may form a PN that provides the CPNS. Further, the PN GW is responsible for connection between heterogeneous networks for a device located in a PN, which cannot access an external network, registers connected devices to a CPNS server, and manages inventories.

A PN GW of a device may connect a PNE of a PN and another device to the CPNS server. The PN GW of the device uses a global network such as a mobile network. Further, the PN GW manages services for PNEs and manages communication and other function information.

8) PN inventory: The PN inventory includes information about a PN(s). When a PN is established or changed, a PN inventory is generated or updated (e.g. by adding and deleting PN information).

The CPNS server may store PN information registered to the CPNS server in a PN inventory. Upon receipt of a successful PN setup response from the CPNS server, the PN GW may add PN information to a PN inventory. Upon receipt of a successful PN setup response and notification from the PN GW, a PNE may add the PN information to a PN inventory.

Upon receipt of a request for releasing a specific PN, the CPNS server deletes corresponding PN information from the PN inventory. Upon receipt of a successful PN release response from the CPNS server, the PN GW may delete PN information from the PN inventory. Upon receipt of a successful PN release response and notification from the PN GW, the PNE may delete PN information from the PN inventory.

Further, when a CPNS entity manages the PN, device capabilities need to be checked, or a PNE requests PN information about other CPNS users or PN information about a remote PN of a CPNS server through service discovery, a PN inventory may be used.

9) PN Info: Information about a PN. When a PN is established, PN information about the PN is stored or updated in a PN inventory. If the PN is released, the PN information is deleted from the PN inventory. Specifically, the PN information includes the attributes of PN Identifier (ID), Description, Temp PN, Active, Sharing, Disclosure, OwnershipEntityID, PN GW Info, and PNE Info. The PN ID identifies a PN and the Description describes the PN. The Temp PN is information indicating whether the PN is temporary. The Active attribute indicates an active state of the PN. If at least one PNE is physically connected to the PN, the PN is active. If all PNEs are disconnected from the PN, the PN is not active. The Sharing attribute indicates a PN inventory sharing level for a PNE side. In the case of service discovery after PN setup, the Disclosure attribute indicates an intention to disclose the PN information. The Disclosure attribute is set to one of Blocked, Open, and Selective. The OwnershipEntityID identifies an authenticated CPNS entity authorized to disclose PN information, upon request of service discovery. The PN GW Info and the PNE Info provide information about a PN GW and information about a PNE, respectively.

For details of a PN inventory and PN information, refer to [Table 9].

Figure 9:
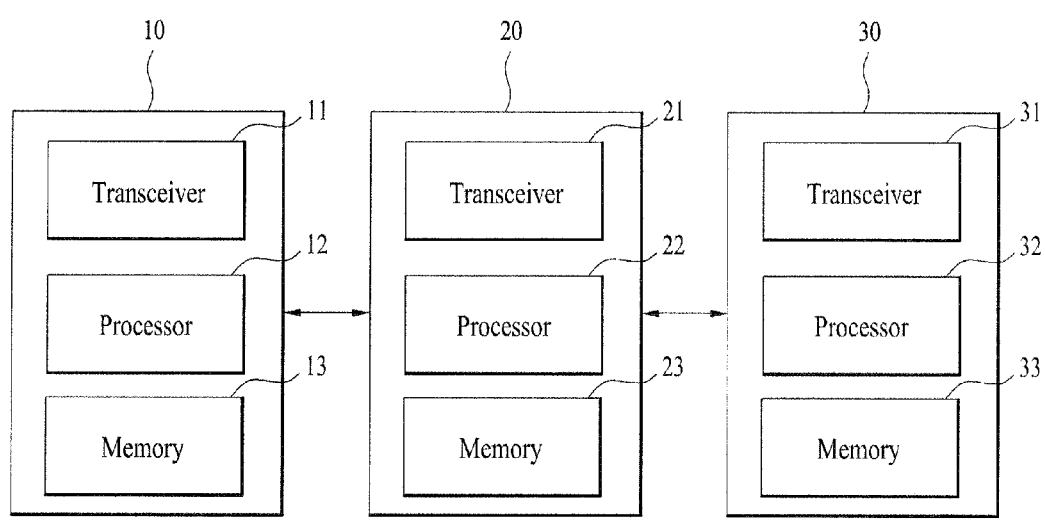
FIG. 9 is a block diagram showing an apparatus or server for implementing the embodiments of the present invention.

10) PN Usage Info: Information including previous PN configuration information (about a PN GW and member PNEs) that a user used and preferences of PN usage information (PN Alias, Expiration Time, etc.). Specifically, the PN usage information includes PNUsageInfoIndex, PN Alias, Expiration Time, (PNID), PNGW ID, and PNE ID #n (as illustrated in FIGS. 9 and 10). The PNUsageInfoIndex is an index indicating PN usage information in a PN usage information list, the PN Alias is an alias that helps a user to memorize PN usage information easily, the Expiration Time specifies a time at which a valid time of PN usage information expires and the PN usage information is deleted, and entities of the PN may be determined based on the PN ID, the PNGW ID, and the PNE ID.

11) PN Usage Info List: A PN usage information list including PN usage information. The PN usage information list resides in (a PN usage information storage), a CPNS server, a PN GW, and a PNE. The PN usage information list may be created when PN usage information is initially stored and may be updated when PN usage information is added and deleted.

The CPNS server may store PN usage information and a copy of PN information (PN information without a PN ID) in the PN usage information list. The PN GW and the PNE may store a summary of the PN usage information in PN usage information lists according to a user-selected option of storing PN usage information (see FIGS. 9 and 10).

12) Service Group: A set of PNEs and PN GWs that share services, data, and applications. The service group refers to a set of devices registered to a server through a generated PN. All of the member devices of the service group do not need to belong to the same PN. The member devices of the service group may be geographically distributed in a plurality of PNs and thus may not be connected directly.

Further, the member devices of the service group may not need to be owned by the same user.

13) Zone: A specific geographic area.

14) Zone-based service: a CPNS service to be provided in a zone that a PN GW covers.

15) Zone PN GW: a PN GW that provides a unique service or content in a zone.

16) Modes of CPNS-enabled entity: A CPNS device may operate in a PN GW mode and a PNE mode. The modes may be known between devices by a CPNS entity discovery function. A PN should include at least a device operating as a PN GW and a device operating as a PNE. Each of the PNE and the PN GW should know the other's mode to establish or join a PN. The PN GW should be able to identify the PNE to join the PNE as a member of the PN. The PNE should know the PN GW to establish a new PN or join an existing PN.

In the presence of a device supporting only the PNE mode (e.g., an MP3 player or a smart meter), the device operates only as a PNE. If a device can operate only as a PN GW, the device operates as a PN GW. On the other hand, if a device can operate as either of a PN GW and a PNE, the device may operate as a PN GW or a PNE according to a pre-stored setting value and its mode may be changed by a user setting or an operator setting.

17) PN admin (administrator): This refers to a PN GW or PNE authorized to administer information about adminee belonging to the same user. Accordingly, the PN admin may request to change information about the PNE or PN GW corresponding to the adminee and information about a PN to which the PNE or PN GW belongs.

18) PN adminee: This refers to a PNE or PN GW, in which PNE or PN GW information of a PN inventory may be changed by the PN admin of the same PN. That is, this is an adminee administered by the PN admin and is a PNE or PN GW, in which the PNE or PN GW information of the PN inventory may be changed by the PN admin.

Figure 2:
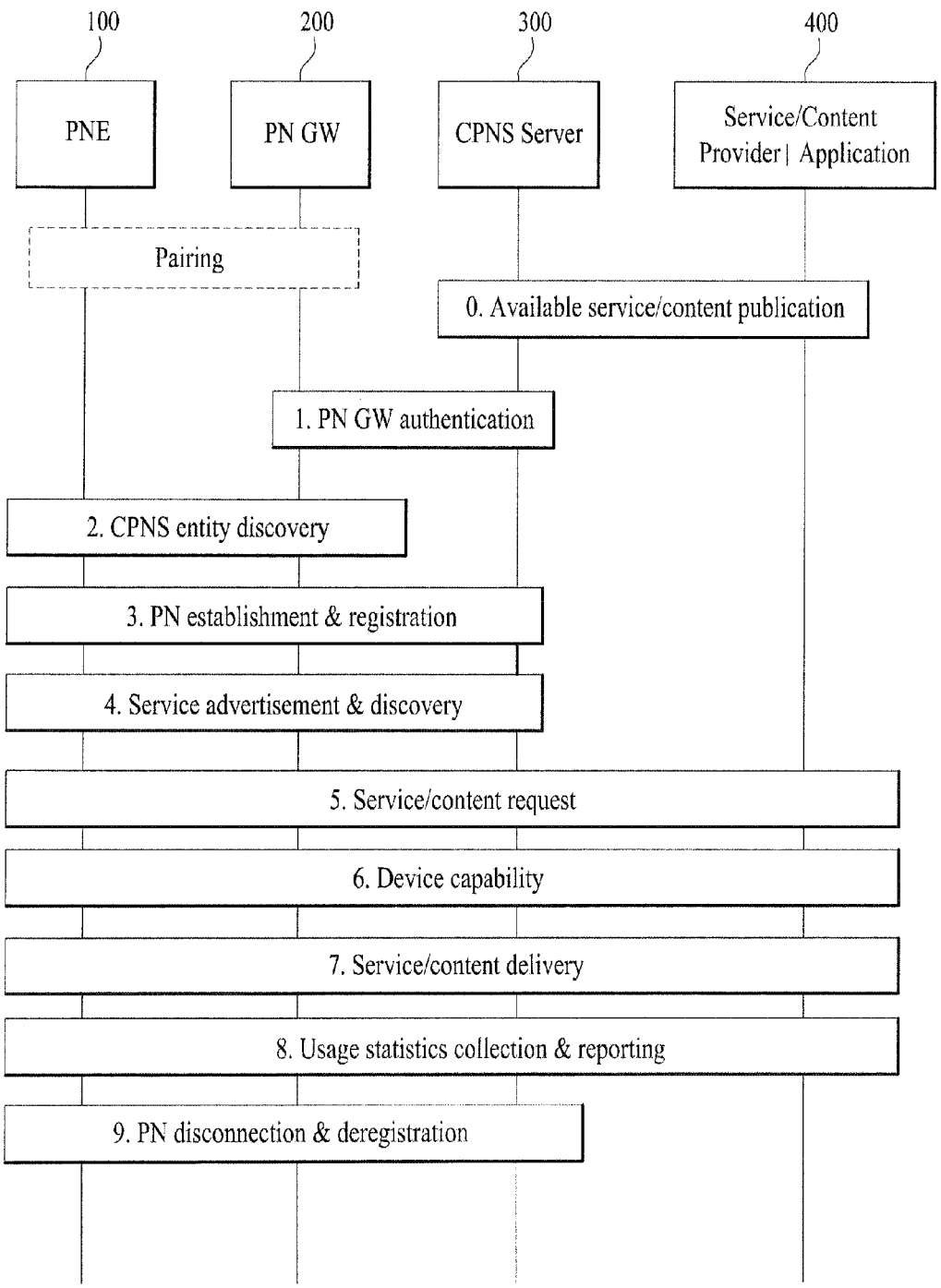
FIG. 2 is a diagram showing an overall procedure of a CPNS.

FIG. 2 is a diagram illustrating a signal flow for an overall CPNS procedure. As noted from FIG. 2, the CPNS may be implemented by a PNE 100, a PN GW 200, a CPNS server 300, a service/content provider or application server 400.

The PNE 100 and the PN GW 200 are devices owned by User A. For example, the PNE 100 is a portable multimedia device of User A including only a second transceiver that may form a PN and operate, for example, in Bluetooth, Wireless Fidelity (WiFi), or ZigBee, without a first transceiver communicating with a mobile communication network. The PN GW 200 is a cellular phone of User A including a first transceiver to connect to the CPNS server 300 and a mobile communication network. The PN GW 200 may further include a second transceiver that operates, for example, in Bluetooth, WiFi, or ZigBee to form a PN.

Each of the PNE 100 and the PN GW 200 may include a CPNS-enabled entity. The CPNS-enabled entity may operate in a PN GW mode or a PNE mode. In FIG. 2, since the PN GW 200 includes the first transceiver communicating with the mobile communication network, the PN GW 200 operates as a gateway, whereas the PNE 100 operates as a PNE due to the absence of the first transceiver.

Before CPNS messages are transmitted and received, a physical connection (pairing) should be established between the PNE 100 and the PN GW 200 by a PAN technology. It is assumed that the PNE 100 is a first PNE which participates in the PN. While only one PNE 100 is shown in FIG. 2, a plurality of PNEs may exist in the PN.

0. Whenever a service and content is available, the service/content provider or application server 400 publishes a service description to the CPNS server 300.

1. The PN GW 200 is authenticated by the CPNS server 300. This procedure may be performed before or after the pairing between the PN GW 200 and the PNE 100. While step 1 is performed after the pairing between the PNE 100 and the PN GW 200 in FIG. 2, this is purely exemplary.

2. The PNE 100 or the PN GW 200 initiates CPNS entity discovery. The CPNS entity discovery enables discovery of a current operational CPNS mode (the PNE mode or the PN GW mode) in a CPNS device.

3. The PNE 100 and the PN GW 200 are connected to each other through a PN. The PN GW 200 creates information about the PN for a PN inventory. The PN GW 200 may register the PN by transmitting the PN inventory to the CPNS server 300.

4. The CPNS server 300 advertises the service description to the PNE 100 or the PNE 100 queries about the service description to the CPNS server 300.

5. The PNE 100 invokes a service or requests content based on the service description provided by the CPNS server 300.

6. Information about device capabilities of the PNE 100 that consumes a service or content may be shared with the CPNS server 300 and/or the service/content provider 400, for delivery of the service and content.

7. The service/content provider 400 delivers the service or content to the PNE 100.

8. The PNE 100 reports all information about service usage from the CPNS device based on a user preference or a policy. The CPNS server 300 collects the report from the PNE(s) with related user information.

9. The PNE 100 or the PN GW 200 requests disconnection from the PN. Then, the PN GW 200 de-registers to the CPNS server 300 on behalf of the PNE 100.

Figure 3:
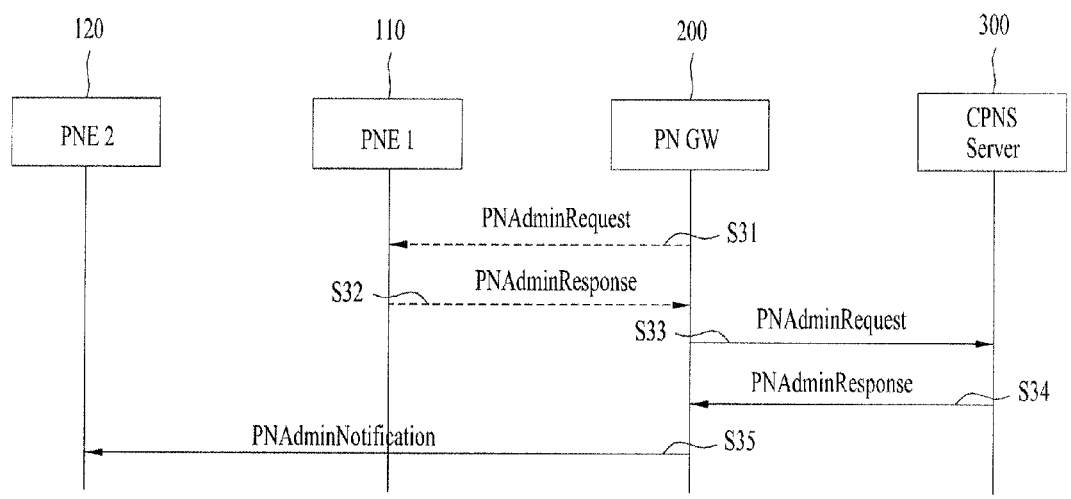
FIG. 3 is a diagram showing a message flow of a procedure of assigning or releasing a PN admin according to one embodiment of the present invention.

FIG. 3 is a diagram conceptually showing a procedure of assigning or releasing a PN admin in a PN according to one embodiment of the present invention. Assignment and release of the PN admin may be requested or initiated by a PNE or PN GW (also referred to as a "candidate PN admin") which will be or is a PN admin. Referring to FIG. 3, the PN GW 200 may initiate a PN admin assignment procedure of assigning the PN GW 200 as a PN admin or a PN admin release procedure of releasing the PN admin if the PN GW 200 was already the PN admin.

In the embodiment shown in FIG. 3, assume that the PN GW 200 becomes a PN admin of an established PN. In addition, the PN GW 200 may add a PNE1 110 as an adminee while assigning the PN admin. In this case, the PN GW 200 may transmit a PNAdminRequest message to the PNE1 110 (S31). The PNAdminRequest message may include information indicating that the PN admin is assigned and the adminee is added. Accordingly, the PNAdminRequest message may include information indicating the PN, information indicating the PN admin, etc. In addition, the PNAdminRequest message may include supplementary information for adding the adminee. For example, the PNAdminRequest message may include a PNE ID indicating the adminee and an adminee attribute value set as a "TRUE" value.

When the PNAdminRequest message is received, the PNE1 110 may transmit a PNAdminResponse message to the PN GW 200 according to the supplementary information or attribute value included in the PNAdminRequest message (S32). When the PNAdminRequest message includes the supplementary information indicating that the adminee is added, the PNE1 110 may determine whether the request to add the adminee is accepted. When the PN GW 200, which has requested to add the adminee, is a candidate PN admin of the PN and the PNE1 110 accepts the request to add the adminee, the result of requesting to add the adminee is set to "successful" and thus the PNE1 110 may transmit a PNAdminResponse message including the result to the PN GW 200 (S32). When the PNE1 110 does not accept the request to add the adminee, the result of requesting to add the adminee is set to failure or addition of the adminee is set to failure and thus the PNE1 110 may transmit the PNAdminResponse message including the result to the PN GW 200 (S32). Alternatively, when the PN GW 200, which has requested to add the adminee, is not a PN admin of the PN, the result of requesting to add the adminee is set to failure or the requesting PN admin is set to "incorrect" and thus the PNE1 110 may transmit the PNAdminResponse message including the result to the PN GW 200 (S32). S31 and S32 correspond to the procedure of assigning the PN admin and adding the adminee and thus are optional.

When the PNAdminResponse message is received, the PN GW 200 may transmit a PNAdminRequest message to a CPNS server 300 according to the value of the result of requesting to add the adminee included in the PNAdminResponse message (S33). If the value of the result of requesting to add the adminee included in the PNAdminResponse message is "successful", the PN GW 200 may transmit the same PNAdminRequest message as the message transmitted in S31 to the CPNS server 300. Otherwise, since the request to add the adminee has failed, the PNAdminRequest message for requesting to assign the PN admin may be transmitted to the CPNS server 300 without adding the adminee (S33).

If the value of the result of requesting to add the adminee is "successful", information indicating that the PN admin is assigned and the adminee is added is included in the PNAdminRequest message transmitted to the CPNS server 300. In this case, when a PN admin does not exist in the PN, the PN GW 200 which has requested to assign the PN admin has enough capabilities (e.g., UI capabilities), that is, predetermined capabilities or more, and the PN GW 200 which has requested to assign the PN admin and the PNE1 110 which will be added as the adminee belong to the same CPNS user, the CPNS server 300 may update a PN inventory thereof with respect to assignment of the PN admin and addition of the adminee. In this case, the CPNS server 300 may set the result of assigning the PN admin and adding the adminee to "successful" and transmit a PNAdminResponse message including the value of the result to the PN GW 200 (S34). When the PN admin was already assigned in the PN or when the PN GW 200 which has requested to assign the PN admin does not have predetermined capabilities or more, the CPNS server 300 may set the result of assigning the PN admin and adding the adminee to "failure" (that is, PN admin assignment failure) and transmit a PNAdminResponse message including the value of the result to the PN GW 200 (S34). When the PN GW 200 which has requested to assign the PN admin and the PNE1 110 which will be added as the adminee do not belong to the same CPNS user, the CPNS server 300 may set the result of assigning the PN admin and adding the adminee to "failure" (that is, PN admin assignment failure) and transmit a PNAdminResponse message including the value of the result to the PN GW 200 (S34).

When the value of the result of requesting to add the adminee is "failure" or when only the PN admin is requested to be assigned without adding the adminee, the PNAdminRequest message transmitted to the CPNS server 300 includes information indicating that the PN admin is assigned. In this case, when a PN admin does not exist in the PN and the PN GW 200 which has requested to assign the PN admin has enough capabilities (e.g., UI capabilities), that is, predetermined capabilities or more, the CPNS server 300 may update the PN inventory thereof with respect to assignment of the PN admin. In this case, the CPNS server 300 may set the result of assigning the PN admin to "successful" and transmit the PNAdminResponse message including the value of the result to the PN GW 200 (S34). Otherwise, the CPNS server 300 may set the result of assigning the PN admin to "failure" (that is, PN admin assignment failure) and transmit a PNAdminResponse message including the value of the result to the PN GW 200 (S34).

When the PNAdminResponse message is received from the CPNS server 300, the PN GW 200 may perform subsequent operations according to the value of the result included in the received PNAdminResponse message. When the value of the result is "successful", the PN GW 200 may update the PN inventory thereof with respect to assignment of the PN admin or addition of the adminee. The PN GW 200 may transmit a PNAdminNotification message indicating that the PN admin has been assigned or the adminee has been added to other PNEs of the PN (S35). When the value of the result is "failure", the PN GW 200 does not take any action.

When the PN GW 200 is already assigned as the PN admin, the PN GW 200 may request to release the PN admin. In this case, only S33 to S35 shown in FIG. 3 may be performed. In this case, unlike assignment of the PN admin or addition of the adminee, the PN GW 200 may transmit a PNAdminRequest message including information indicating that the PN admin is released to the CPNS server 300 (S33). When the PNAdminRequest message is received, the CPNS server 300 may confirm that the information included in the PNAdminRequest message indicates that the PN admin is released. In this case, when the requester of the PNAdminResuqest message, that is, the PN GW 200, corresponds to the PN admin, the CPNS server 300 may update the PN admin attribute value to "FALSE" in the PN inventory thereof and update the adminee attribute value to "FALSE" in the PN inventory thereof because all adminees are removed due to release of the PN admin. In addition, the CPNS server 300 may set the value of the result of requesting to release the PN admin to "successful" and transmit the PNAdminResponse message including the value of the result to the PN GW 200 (S34). When the requester of the PNAdminResuqest message, that is, the PN GW 200, does not correspond to the PN admin, the CPNS server 300 may set the value of the result of requesting to release the PN admin to "failure" (e.g., the request to release the PN admin is incorrect) and transmit the PNAdminResponse message including the value of the result to the PN GW 200 (S34).

When the PNAdminResponse message is received from the CPNS server 300, the PN GW 200 may perform subsequent operations according to the value of the result included in the received PNAdminResponse message. When the value of the result is "successful", the PN GW 200 may update the PN inventory thereof with respect to release of the PN admin. In addition, the PN GW 200 may transmit a PNAdminNotification message indicating that the PN admin has been released to other PNEs of the PN (S35). When the value of the result is "failure", the PN GW 200 does not take any action.

Figure 4:
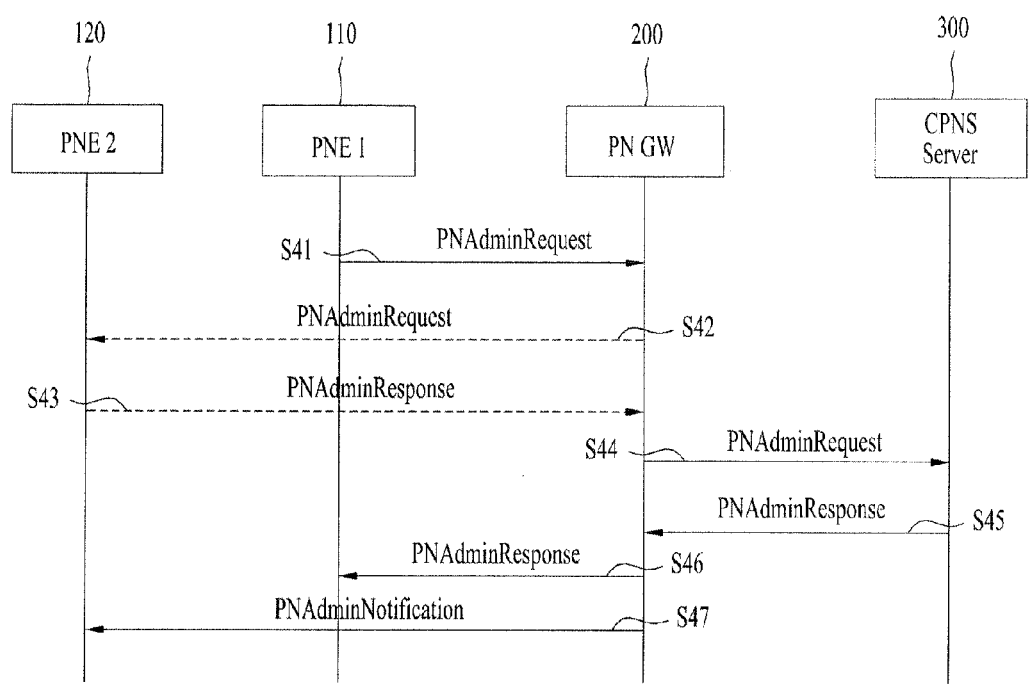
FIG. 4 is a diagram showing a message flow of a procedure of assigning or releasing a PN admin according to one embodiment of the present invention.

FIG. 4 is a diagram conceptually showing a procedure of assigning or releasing a PN admin according to one embodiment of the present invention. In the embodiment of FIG. 4, the procedure of assigning or releasing the PN admin is initiated by the PNE1 110.

When the PNE1 110 requests to assign the PN admin in order to become the PN admin or requests to release the PN admin if the PNE 110 was already assigned to a PN admin, the PNE1 110 may transmit a PNAdminRequest message to the PN GW 200 (S41). The PNAdminRequest message may include information indicating that the PN admin is assigned or the PN admin is released. The PNAdminRequest message may include information indicating a PN, information indicating a PN admin and PN admin attributes set to "TRUE". When the PNE1 110 requests to add an adminee while assigning the PN admin, the PNAdminRequest message may include information indicating that the PN admin is assigned and the adminee is added, instead of the information indicating that the PN admin is assigned. In this case, the PNAdminRequest message may include supplementary information indicating that the adminee is added. The PNAdminRequest message may include a PNE ID indicating the adminee and may include an adminee attribute value set to "TRUE".

When the PNAdminRequest message is received, the PN GW 200 may confirm information included in the PNAdminRequest message and perform operation according to the information. If the information indicating that the PN admin is assigned and the adminee is added is included in the PNAdminRequest message, the PN GW 200 may transmit a PNAdminRequest message for adding the adminee to a PNE2 120 which will be added as an adminee (S42).

When the PNAdminRequest message includes information indicating that the adminee is added, the PNE2 120 may determine whether the request to add the adminee is accepted. When the PNE1 110, which has requested to add the adminee, is a candidate PN admin of the PN and the PNE2 120 accepts the request to add the adminee, the result of requesting to add the adminee is set to "successful" and thus the PNE2 120 may transmit a PNAdminResponse message including the result to the PN GW 200 (S43). When the PNE2 120 does not accept the request to add the adminee, the result of requesting to add the adminee is set to failure or addition of the adminee is set to failure and thus the PNE2 120 may transmit the PNAdminResponse message including the result to the PN GW 200 (S43). Alternatively, when the PNE1 110 which has requested to add the adminee is not a PN admin of the PN, the result of requesting to add the adminee is set to failure or the requesting PN admin is set to "incorrect" and thus the PNE2 120 may transmit the PNAdminResponse message including the result to the PN GW 200 (S43).

When the PNAdminResponse message is received from the PNE2 120, the PN GW 200 may confirm the information included in the message and perform subsequent operations. If the result included in the PNAdminResponse message is "successful", the PN GW 200 may forward the PNAdminRequest message received from the PNE1 110, which is an initiator of the embodiment shown in FIG. 4, to the CPNS server 300 (S44). Otherwise, that is, when addition of the adminee is set to "failure" the PN GW 200 may transmit the PNAdminRequest message for requesting to assign the PN admin to the CPNS server 300 (S44). In this case, the PNAdminRequest message may include information indicating that the PN admin is assigned, information indicating the PN, information indicating the PN admin, the PN admin attributes set to "TRUE", etc.

S42 and S43 are performed only when the PNAdminRequest message transmitted in S41 includes information indicating that the PN admin is assigned and the adminee is added.

When the PNAdminRequest message transmitted in S41 includes the information indicating that the PN admin is assigned, the PN GW 200 may forward the PNAdminRequest message to the CPNS server 300 (S44).

When the PNAdminRequest message transmitted in S41 includes information indicating that the PN admin is released, the PNE1 110 which has requested to release the PN admin is a PN admin of the PN, the PN GW 200 may forward the PNAdminRequest message to the CPNS server 300 (S44). Otherwise, the PN GW 200 may set the result of requesting to release the PN admin to failure or set the requesting PN admin to "incorrect" and transmit the PNAdminResponse message including the result to the PNE1 110.

When the PNAdminRequest message is received from the PN GW 200, the CPNS server 300 may perform the following process.

When the value of the result of requesting to add the adminee is "successful", the information indicating that the PN admin is assigned and the adminee is added is included in the PNAdminRequest message transmitted to the CPNS server 300 (S44). In this case, when a PN admin does not exist in the PN, the PN GW 200 which has requested to assign the PN admin has enough capabilities (e.g., UI capabilities), that is, predetermined capabilities or more, and the PN GW 200 which has requested to assign the PN admin and the PNE2 120 which will be added as the adminee belong to the same CPNS user, the CPNS server 300 may update the PN inventory thereof with respect to assignment of the PN admin and addition of the adminee. Then, the CPNS server 300 may set the result of assigning the PN admin and adding the adminee to "successful" and transmit the PNAdminResponse message including the value of the result to the PN GW 200 (S45). When the PN admin was already assigned in the PN or when the PN GW 200 which has requested to assign the PN admin does not have predetermined capabilities or more, the CPNS server 300 may set the result of assigning the PN admin and adding the adminee to "failure" (that is, PN admin assignment failure) and transmit the PNAdminResponse message including the value of the result to the PN GW 200 (S45). When the PN GW 200 which has requested to assign the PN admin and the PNE2 120 which will be added as the adminee do not belong to the same CPNS user, the CPNS server may set the result of assigning the PN admin and adding the adminee to "failure" (that is, adminee adding failure) and transmit the PNAdminResponse message including the value of the result to the PN GW 200 (S45).

When the value of the result of requesting to add the adminee is "failure" or when only the PN admin is requested to be assigned without adding the adminee, the PNAdminRequest message transmitted to the CPNS server 300 includes information indicating that the PN admin is assigned. In this case, when a PN admin does not exist in the PN and the PN GW 200 which has requested to assign the PN admin has enough capabilities (e.g., UI capabilities), that is, predetermined capabilities or more, the CPNS server 300 may update the PN inventory thereof with respect to assignment of the PN admin. Then, the CPNS server 300 may set the result of assigning the PN admin to "successful" and transmit the PNAdminResponse message including the value of the result to the PN GW 200 (S45). Otherwise, the CPNS server 300 may set the result of assigning the PN admin to "failure" (that is, PN admin assignment failure) and transmit the PNAdminResponse message including the value of the result to the PN GW 200 (S45).

When the value of the result of requesting to add the adminee is "failure" or when the PN admin is requested to be assigned without adding the adminee, the PNAdminRequest message transmitted to the CPNS server 300 includes the information indicating that the PN admin is assigned. In this case, when a PN admin does not exist in the PN and the PN GW 200 which has requested to assign the PN admin has enough capabilities (e.g., UI capabilities), that is, predetermined capabilities or more, the CPNS server 300 may update the PN inventory thereof with respect to assignment of the PN admin. Then, the CPNS server 300 may set the result of assigning the PN admin to "successful" and transmit the PNAdminResponse message including the value of the result to the PN GW 200 (S45). Otherwise, the CPNS server 300 may set the result of assigning the PN admin to "failure" (that is, PN admin assignment failure) and transmit the PNAdminResponse message including the value of the result to the PN GW 200 (S45).

When the PNE1 110 was already assigned as the PN admin, the PNE1 110 may request to release the PN admin. In this case, unlike assignment of the PN admin or addition of the PN admin, the PNE1 110 may transmit the PNAdminRequest message including information indicating that the PN admin is released to the PN GW 200 (S41). When the PNAdminRequest message is received, the PN GW 200 may confirm that the information included in the PNAdminRequest message indicates that the PN admin is released. In this case, when the requester of the PNAdminRequest message, that is, the PNE1 110, corresponds to the PN admin, the PN GW 200 may forward the PNAdminRequest message to the CPNS server 300. Otherwise, the PN GW 200 may set the value of the result of requesting to release the PN admin to "failure" (e.g., the PN admin for requesting to release the PN admin is incorrect) and transmit the PNAdminResponse message including the value of the result to the PNE1 110.

When the PNAdminResponse message is received from the CPNS server 300, the PN GW 200 may forward the received PNAdminResponse message to the PNE1 110 (S46). In addition, the PN GW 200 may perform subsequent operations according to the value of the result included in the received PNAdminResponse message. When the value of the result is "successful", the PN GW 200 may update the PN inventory thereof with respect to assignment of the PN admin or addition of the adminee. Then, the PN GW 200 may transmit a PNAdminNotification message indicating that the PN admin is assigned or the adminee is added to the other PNEs of the PN (S47). When the value of the result is "failure", the PN GW 200 does not take any action.

By assigning the PN admin and the adminee in the PN according to the embodiments of the present invention, it is possible to easily administrate the PN and to easily change and share PN information, PNE information and PN GW information.

Figure 5:
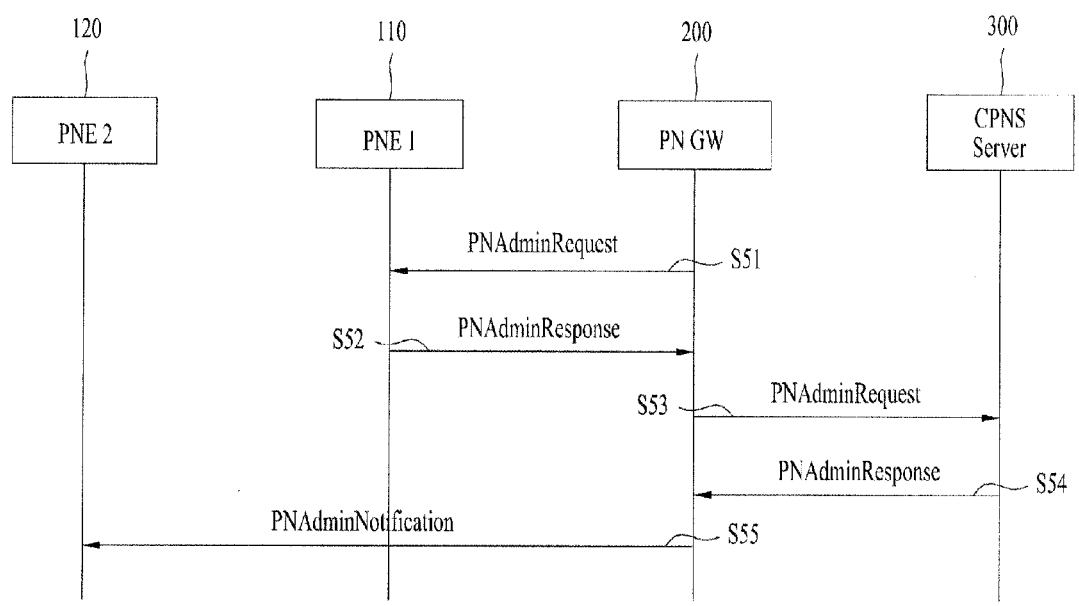
FIG. 5 is a diagram showing a message flow of a procedure of adding or removing an adminee according to one embodiment of the present invention.

FIG. 5 is a diagram showing a message flow of a procedure of adding or removing an adminee according to one embodiment of the present invention. The procedure of adding or removing the adminee may be requested or initiated by a PNE or PN GW which is a PN admin of a PN. In the embodiment of FIG. 5, the procedure of adding or removing the adminee is initiated by the PN GW 200 which is the PN admin.

The PN GW 200 may transmit a PNAdminRequest message to a PNE1 110 which is a candidate adminee in order to request to add an adminee (S51). Here, the term "candidate" is used in step S51 because the PNE1 110, which has received the PNAdminRequest message, may not accept the request. The PNAdminRequest message may include information indicating that the adminee is added. In addition, the PNAdminRequest message may include information indicating a PN, information indicating a PN admin and information indicating an adminee. In particular, when the information indicating the adminee" is included in PNE information (Info), the information indicating the adminee may be set to "TRUE" when the PNAdminRequest message indicates that the adminee is added and may be set to "FALSE" when the PNAdminRequest message indicates that the adminee is removed.

When the adminee is removed, approval or confirmation of an entity to be removed is not necessary. The same is true in the embodiment of FIG. 6. Accordingly, S51 to S52 of FIG. 5 may be omitted and the PN GW 200 may transmit a PNAdminRequest message for removing the adminee to a CPNS server 300 (S53). When the PNAdminRequest message is received from the PN GW 200, the PNE1 110 may transmit a PNAdminResponse message to the PN GW 200 according to an attribute value or information included in the PNAdminRequest message (S52). When the PNAdminRequest message includes information indicating that the adminee is added", the PNE1 110 may determine whether the request to add the adminee is accepted. When the PN GW 200, which has requested to add the adminee, is a PN admin of the PN and the PNE1 110 accepts the request to add the adminee, the result of adding the adminee is set to "successful" and the PNE11 110 becomes the adminee of the PN when the request is a request to add the adminee. The PNE1 110 may transmit the PNAdminResponse message including the result to the PN GW 200 (S52). When the PNE1 110 does not accept the request to add the adminee, the result of requesting to add the adminee is set to failure or adminee adding failure and the PNE1 110 may transmit the PNAdminResponse message including the result to the PN GW 200 (S52). Alternatively, when the PN GW 200, which has requested to add the adminee, is not a PN admin of the PN, the result of requesting to add the adminee is set to failure or the requesting PN admin is set to "incorrect" and the PNE1 110 may transmit the PNAdminResponse message including the result to the PN GW 200 (S52).

When the PNAdminResponse message is received from the PNE1 110, the PN GW 200 may confirm the result included in the message. If the result is "successful", the PN GW 200 may transmit the same PNAdminRequest message as that transmitted in S51 to the CPNS server 300 (S53).

When the PN GW 200 removes an adminee or the PNE1 110 which was an adminee, the PN GW 200 may transmit a PNAdminRequest message for removing the adminee to the CPNS server 300 (S53).

When the PNAdminRequest message is received from the PN GW 200, the CPNS server may perform different operations depending on whether the request transmitted in S53 is a request to add or remove the adminee.

When the transmitted request is a request to add the adminee, a requester, which has requested to add the adminee, that is, the PN GW 200, is a PN admin of the PN, and the PN admin, that is, the PN GW 200, and the added adminee, that is, the PNE1 110, belong to the same CPNS user, the CPNS server 300 may update a PN inventory thereof with respect to addition of the adminee. In addition, the CPNS server 300 may transmit the PNAdminResponse message including indicating "successful" to the PN GW 200 (S54). Otherwise, the CPNS server 300 may transmit the PNAdminResponse message including the result "failure" (e.g., adminee adding failure) to the PN GW 200 (S54).

If the transmitted request is a request to remove the adminee, when a requester, which has requested to remove the adminee, that is, the PN GW 200, and the requested adminee, that is, the PNE1 110, are correct, the CPNS server 300 may update the PN inventory thereof with respect to removal of the adminee. In addition, the CPNS server 300 may transmit the PNAdminResponse message including the result indicating "successful" to the PN GW 200 (S54). When the PN admin, which has requested to remove the adminee, that is, the PN GW 200, is not a PN admin of the PN, the CPNS server 300 may transmit the PNAdminResponse message including the result indicating "failure" (e.g., the PN admin for requesting to remove the adminee is incorrect) to the PN GW 200 (S54). When the requested adminee, that is, the PNE1 110, is not an adminee of the PN, the CPNS server 300 may transmit the PNAdminResponse message including the result indicating "failure" (e.g., the requested adminee is incorrect) to the PN GW 200 (S54).

When the PNAdminResponse message is received from the CPNS server 300, the PN GW 200 may confirm the result included in the message. If the result is successful, the PN GW 200 may update the PN inventory thereof with respect to addition or removal of the adminee. If the result is successful, the PN GW 200 may transmit a PNAdminNotification message notifying that the adminee is added or removed to other PNEs of the PN (S55). If the result is "failure", the PN GW 200 does not take any action.

Figure 6:
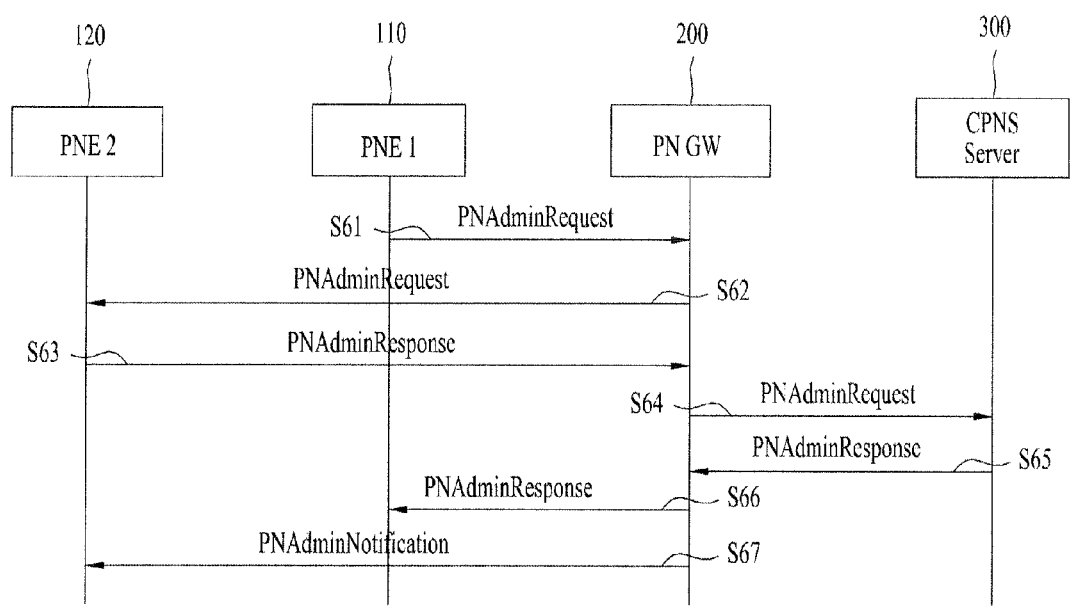
FIG. 6 is a diagram showing a message flow of a procedure of adding or removing an adminee according to one embodiment of the present invention.

FIG. 6 is a diagram showing a message flow of a procedure of adding or removing an adminee according to one embodiment of the present invention. In the embodiment of FIG. 6, the procedure of adding or removing the adminee is initiated by the PNE1 110 which is the PN admin.

The PNE1 110 may transmit a PNAdminRequest message to the PN GW 200 in order to request to add or remove the adminee (S61). The PNAdminRequest message may include information indicating that the adminee is added or the adminee is removed. In addition, the PNAdminRequest message may include information indicating a PN, information indicating a PN admin and information indicating an adminee. The information indicating the PN admin may be set to "TRUE". When the information indicating the adminee is included in PNE information (Info), the information indicating the adminee may be set to "TRUE" when the PNAdminRequest message indicates that the adminee is added and may be set to "FALSE" when the PNAdminRequest message indicates that the adminee is removed.

When the PNAdminRequest message is received from the PNE1 110, the PN GW 200 may determine whether the PNE, which has requested to add or remove the adminee, is a PN admin of the PN. When the PNE, which has requested to add or remove the adminee, is not a PN admin, the PN GW 200 may transmit a PNAdminResponse message including the result indicating "failure" (e.g., the PN admin, which has requested to add or remove the adminee, is incorrect) to the PNE1 110. When the PNE, which has requested to add or remove the adminee, is a PN admin, different operations may be performed depending on whether the request is a request to add or remove the adminee. When the request is to a request to add the adminee and the PN admin, that is, the PNE1 110, and the PNE2 120 corresponding to the candidate adminee belong to the same CPNS user, the PN GW 200 may forward the PNAdminRequest message to the PNE2 120 corresponding to the candidate adminee (S62). In this case, the PN GW 200 may forward the PNAdminRequest message to the CPNS server 300 (S64).

However, when the PN admin, that is, the PNE1 110, and the PNE2 120 corresponding to the candidate adminee do not belong to the same CPNS user or when the PN GW 200 rejects the request to add the adminee, the PN GW 200 may transmit the PNAdminResponse including the information indicating "failure" (e.g., adminee adding failure) to the PNE1 110.

When the PNAdminRequest message is received from the PN GW 200, the PNE2 120 may transmit a PNAdminResponse message to the PN GW 200 according to an attribute value or information included in the PNAdminRequest message (S63). When the PNAdminRequest message includes information indicating that the adminee is added, the PNE2 120 may determine whether the request to add the adminee is accepted. When the PN GW 200, which has requested to add the adminee, is a PN admin of the PN and the PNE2 120 accepts the request to add the adminee, the result of requesting to add the adminee is set to "successful" and the PNE2 120 becomes an adminee of the PN when the request is a request to add the adminee. The PNE2 120 may transmit the PNAdminResponse message including the result to the PN GW 200 (S63). When the PNE2 120 does not accept the request to add the adminee, the result of requesting to add the adminee is set to failure or adminee adding failure and the PNE2 120 may transmit the PNAdminResponse message including the result to the PN GW 200 (S63). When the PN GW 200, which has requested to add the adminee, is not a PN admin of the PN, the result of requesting to add the adminee is set to failure or the requesting PN admin is set to "incorrect" and the PNE2 120 may transmit the PNAdminResponse message including the result to the PN GW 200 (S63).

When the PNAdminRequest message transmitted in S61 is a request to remove the adminee, the PN GW 200 may forward the PNAdminRequest message to the CPNS server 300 (64). This may be implicitly performed by the PN GW 200 which is the PN admin. That is, when the adminee is removed, S62 to S63 of FIG. 6 may be omitted.

When the PNAdminResponse message is received from the PNE2 120, the PN GW 200 may confirm the result included in the message. When the result indicates "successful", the PN GW 200 may forward the PNAdminRequest message received in S61 to the CPNS server 300 (S64). When the result indicates "failure", the PN GW 200 does not take any action or the PN GW 200 may forward the received PNAdminResponse message to the PNE1 110.

When the PNAdminRequest message is received from the P GW 200, the CPNS server 300 may perform different operations depending on whether the request transmitted by the PNE1 110 in S61 is a request to add or remove the adminee.

When the transmitted request is a request to add the adminee, the requester, which has requested to add the adminee, that is, the PNE1 110, is a PN admin of the PN, and the PN admin, that is, the PNE1 110, and the added adminee, that is, the PNE2 120, belong to the same CPNS user, the CPNS server 300 may update the PN inventory thereof with respect to addition of the adminee. In addition, the CPNS server 300 may transmit the PNAdminResponse message including the result indicating "successful" to the PN GW 200 (S65). Otherwise, the CPNS server 300 may transmit a PNAdminResponse message including the result indicating "failure" (e.g., adminee adding failure) to the PN GW 200 (S65).

When the transmitted request is a request to remove the adminee and the PN admin, which has requested to remove the adminee, that is, the PNE1 110, and the requested adminee, that is, the PNE2 120 are correct, the CPNS server 300 may update the PN inventory thereof with respect to removal of the adminee. In addition, the CPNS server 300 may transmit a PNAdminResponse message including the result indicating "successful" to the PN GW 200 (S65). When the PN admin, which has requested to remove the adminee, that is, the PNE1 110, is not a PN admin of the PN, the CPNS server 300 may transmit the PNAdminResponse message including the result indicating "failure" (e.g., the PN admin for requesting to remove the adminee is incorrect) to the PN GW 200 (S65). When the requested adminee, that is, the PNE2 120, is not an adminee of the PN, the CPNS server 300 may transmit the PNAdminResponse message including the result "failure" (e.g., the requested adminee is incorrect) to the PN GW 200 (S65).

When the PNAdminResponse message is received from the CPNS server 300, the PN GW 200 may forward the received PNAdminResponse message to the PNE1 110 (S66).

When the result of the received PNAdminResponse message is successful, the PN GW 200 may update the PN inventory thereof with respect to addition or removal of the adminee. In this case, the PN GW 200 may transmit a PNAdminNotification message to other PNEs of the PN in order to notify that the adminee is added or removed (S67). When the result is "failure", the PN GW 200 does not take any action.

When the PNAdminNotification message is received from the PN GW 200, the other PNEs (not shown) of the PN may update the PN inventory thereof with respect to addition or removal of the adminee.

By assigning at least one of the entities of the PN as an adminee according to the embodiment of FIG. 5 or FIG. 6, it is possible to administrate the PN and the adminee by the PN admin.

Figure 7:
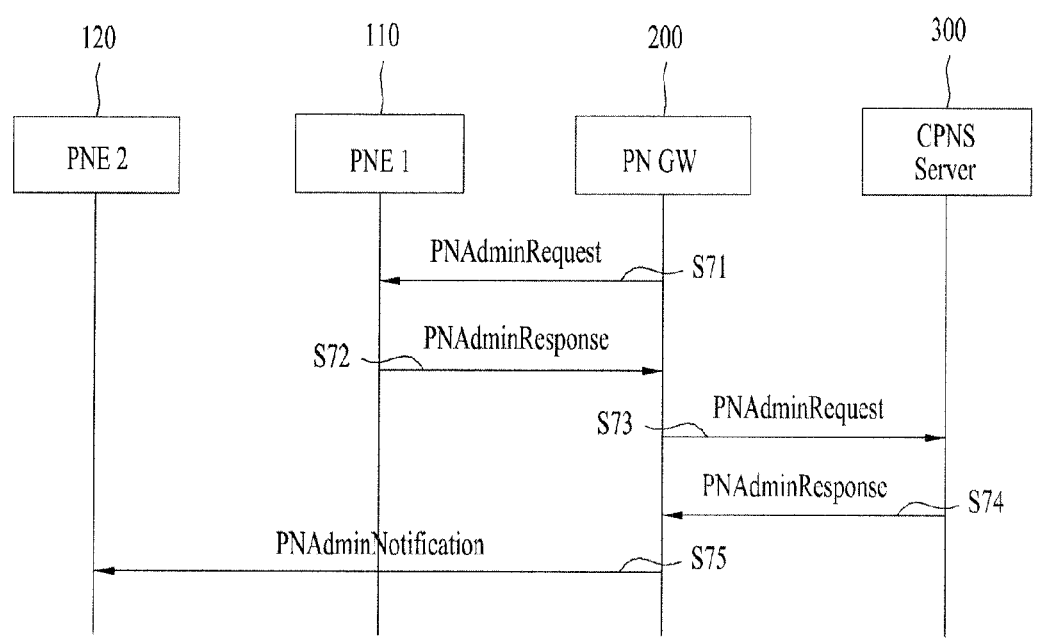
FIG. 7 is a diagram showing a message flow of a procedure of changing information according to one embodiment of the present invention.

FIG. 7 is a diagram showing a message flow of a procedure of changing information according to one embodiment of the present invention. The procedure of changing the information may be requested or initiated by a PNE or PN GW which is a PN admin. In the embodiment of FIG. 7, the procedure is requested or initiated by the PN GW 200 which is the PN admin.

The PN GW 200 may transmit a PNAdminRequest message to the adminee, that is, the PNE1 110, in order to change information about an adminee belonging to a PN (S71). When the PN GW 200 which is the PN admin changes the information related thereto, the PN GW 200 may update a PN inventory thereof and transmit a PNAdminRequest message to the CPNS server 300 in order to notify that the information has been changed. Operation for changing the information related to the PN admin may be performed even when an adminee does not exist in the PN.

The PNAdminRequest message may include information indicating "information change". The information about the adminee which may be changed due to such information change includes PN information, PN GW information and PNE information. Accordingly, the PNAdminRequest message may include information indicating a PN and selectively or additionally include attributes to be changed in the PN information. The PNAdminRequest message may include information indicating a PN admin. The PNAdminRequest message may include information indicating an adminee. The PNAdminRequest message may include an information element including attributes to be changed.

When the PNAdminRequest message is received from the PN GW 200, the PNE1 110 may perform a subsequent procedure depending on whether a requester, which has requested to change information, that is, the PN GW 200, is a PN admin of the PN. When the requester, which has requested to change information, that is, the PN GW 200, is a PN admin of the PN, the PNE1 110 may update the PN inventory thereof according to the request to change the information. In addition, the PNE1 110 may transmit a PNAdminResponse message including the result indicating "successful" to the PN GW 200 (S72). When the requester, which has requested to change the information, that is, the PN GW 200, is not a PN admin of the PN, the PNE1 110 may transmit the PNAdminResponse message including the result indicating "failure" (e.g., the PN admin, which has requested to change the information, is incorrect) to the PN GW 200 (S72).

When the PNAdminResponse message is received from the PNE1 110, the PN GW 200 may confirm the result included in the message. When the result indicates "successful", the PN GW 200 may transmit the PNAdminRequest message transmitted in S61 to the CPNS server 300 (S73). When the result indicates "failure", the PN GW 200 does not take any action.

When the PNAdminRequest message is received from the PN GW 200, the CPNS server 300 may update the PN inventory thereof according to the request to change the information. In addition, the CPNS server 300 may transmit a PNAdminResponse message including the result indicating "successful" to the PN GW 200 (S74).

When the PNAdminResponse message is received from the CPNS server 300, the PN GW 200 may confirm the result included in the received PNAdminResponse message. When the result is "successful", the PN GW 200 may update the PN inventory thereof according to the request to change the information. In addition, the PN GW 200 may transmit a PNAdminNotification message to other PNEs of the PN in order to notify that the information has been changed (S75).

Figure 8:
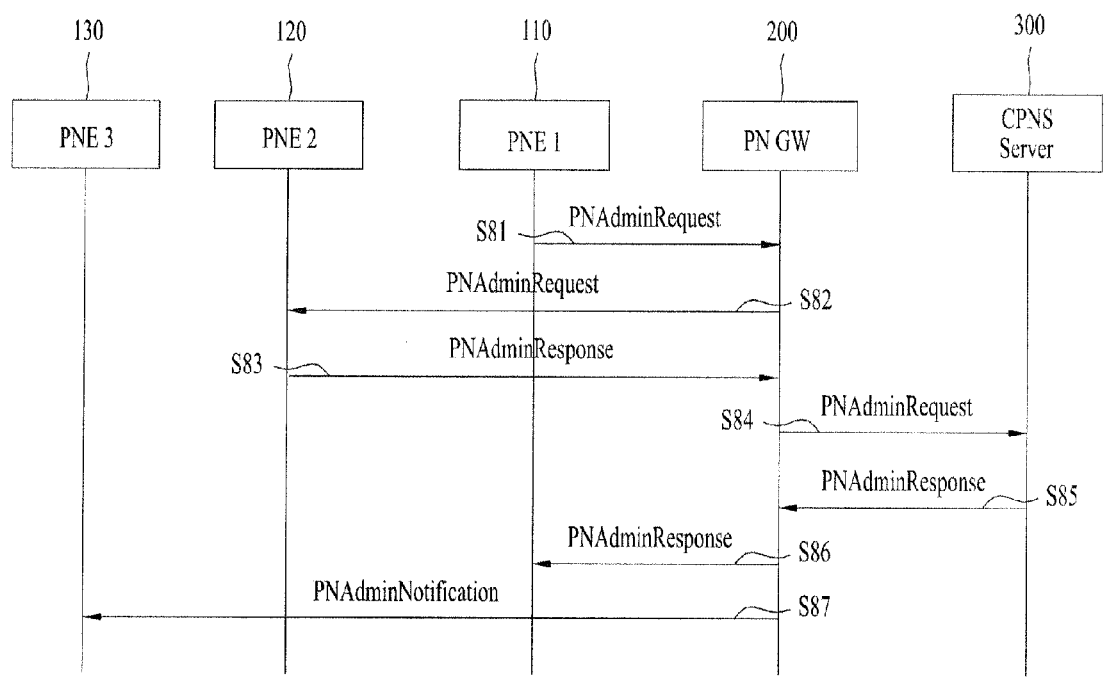
FIG. 8 is a diagram showing a message flow of a procedure of changing information according to one embodiment of the present invention.

FIG. 8 is a diagram showing a message flow of a procedure of changing information according to one embodiment of the present invention. In the embodiment of FIG. 8, the procedure of changing the information may be requested or initiated by a PNE1 110 which is a PN admin.

The PNE1 110 may transmit a PNAdminRequest message to a PN GW 200 in order to change information about an adminee belonging to the PN (S81). When the PNE1 110 which is the PN admin changes the information related thereto, the PNE1 110 may update a PN inventory thereof and transmit a PNAdminRequest message to the PN GW 200 in order to notify that the information has been changed. Operation for changing the information related to the PN admin may be performed even when an adminee does not exist in the PN.

The PNAdminRequest message may include information indicating "information change". The information about the adminee which may be changed due to such information change includes PN information (Info), PN GW information and PNE information. Accordingly, the PNAdminRequest message may include information indicating a PN and selectively or additionally include attributes to be changed in the PN information. The PNAdminRequest message may include information indicating a PN admin. The PNAdminRequest message may include information indicating an adminee. The PNAdminRequest message may include an information element including attributes to be changed.

When the PNAdminRequest message is received from the PNE1 110, the PN GW 200 may confirm whether the PNE1

110, which has transmitted the message, is a PN admin of the PN. When the PNE1 110 is a PN admin of the PN, the PN GW 200 may forward the received PNAdminRequest message to the PNE2 120, information about which will be changed (S82). When the PNE1 110 has requested to change the information about the PN GW 200, the PN GW 200 may transmit a PNAdminResponse message including the result indicating failure or that the requested adminee is incorrect to the PNE1 110 (S86). When the PNE1 110 has requested to change the information thereabout, the PN GW 200 may forward the PNAdminRequest message to the CPNS server 300 (S84). In addition, when the PNE1 110 is not a PN admin of the PN, the PN GW 200 may transmit a PNAdminResponse message including the result indicating failure or that the requesting PN admin is incorrect to the PNE1 110 (S86).

When the PNAdminRequest message is received from the PN GW 200, the PNE2 120 may perform a subsequent procedure depending on whether the requester, which has requested to change the information, that is, the PNE1 110, is a PN admin of the PN. When the requester, which has requested to change the information, that is, the PNE1 110, is a PN admin of the PN, the PNE2 120 may update the PN inventory thereof according to the request to change the information. In addition, the PNE2 120 may transmit a PNAdminResponse message including the result indicating "successful" to the PN GW 200 (S83). When the requester, which has requested to change the information, that is, the PNE1 110, is not a PN admin of the PN, the PNE2 120 may transmit the PNAdminResponse message including the result indicating "failure" (e.g., the PN admin, which has requested to change the information, is incorrect) to the PN GW 200 (S83).

When the PNAdminResponse message is received from the PNE2 120, the PN GW 200 may confirm the result included in the message. When the result indicates "successful", the PN GW 200 may transmit the PNAdminRequest message received in S81 to the CPNS server 300 (S84). When the result indicates "failure", the PN GW 200 does not take any action or the PN GW 200 may forward the received PNAdminResponse message to the PNE1 110.

When the PNAdminRequest message is received from the PN GW 200, the CPNS server 300 may update the PN inventory thereof according to the request to change the information. In addition, the CPNS server 300 may transmit the PNAdminResponse message including the result indicating "successful" to the PN GW 200 (S85).

When the PNAdminResponse message is received from the CPNS server 300, the PN GW 200 may confirm the result included in the message. When the result indicates "successful", the PN GW 200 may transmit the PNAdminResponse message to the PNE1 110 which is the PN admin (S86). In addition, when the result indicates "successful" the PN GW 200 may transmit a PNAdminNotification message to other PNEs of the PN (S87).

By enabling the PN admin to change the information about the adminee according to the embodiment of FIG. 7 or FIG. 8, it is possible to simplify the conventional operation for changing the PN information while generating the PN after the PN has been released. Therefore, it is possible to save unnecessary time and power required to release and generate the PN.

The messages (PNAdminRequest, PNAdminResponse and PNAdminNotification message) used in the embodiments of the present invention described with reference to FIGS. 3 to 8 will be described in combination with ordinals "first", "second", etc. in the claims in order to be distinguished between each other. In the embodiment of FIG. 3, the PNAdminRequest message of S31 may be represented by a first request message, the PNAdminRequest message of S33 may be represented by a second request message, the PNAdminResponse message of S32 may be represented by a first response message and the PNAdminResponse message of S34 may be represented by a second response message.

Table 1 below shows summary information of the messages used in the embodiments of the present invention.

TABLE 1

| Message | Implementation | Direction |
| --- | --- | --- |
| PNAdminRequest | Optional | PNE → PN GW |
| | | PN GW → PNE |
| | | PN GW → CPNS Server |
| PNAdminResponse | Optional | CPNS Server → PN GW |
| | | PN GW → PNE |
| | | PNE → PN GW |
| PNAdminNotification | Optional | PN GW → PNE |

The PNAdminRequest message refers to a message for requesting to assign or release a PN admin, to add or remove an adminee or to change information, which may be transmitted from a PNE to a PN GW, from a PN GW to a PNE or from a PN GW to a CPNS server. The PNAdminResponse message refers to a message responding to the PNAdminRequest message, which may be transmitted from a CPNS server to a PN GW, from a PN GW to a PNE or from a PNE to a PN GW. The PNAdminNotification message refers to a message for notifying other PNEs of a PN that a PN admin is assigned or released, an adminee is added or removed or information is changed, which may be transmitted from a PN GW to PNEs.

Table 2 shows information about the PNAdminRequest message used in the embodiments of the present invention.

TABLE 2

| Element | Cardinality | T | Data Type | Description |
|---|---|---|---|---|
| PNAdminRequest | 1 | E | | Its sub attribute is PNAdminCommand<br>Its sub elements are PNInfo |
| PNAdminCommand | 1 | A | Integer | It is a type of PN action regarding PN Admin<br>1 - Assign PN Admin, assign a new PN Admin in the PN<br>2 - Release PN Admin, release current PN Admin in the PN<br>3 - Add Adminee, add Adminee(s)<br>4 - Remove Adminee, remove Adminee(s)<br>5 - Assign PN Admin and also Add Adminee, assign a new PN Admin and add an Adminee<br>6 - Information change, information change in PN Inventory |
| PNInfo | 1 | E | | PN Information<br>Its sub attributes are<br>PNID<br>Description<br>TempPN<br>Sharing<br>Disclosure<br>OwnershipEntityID<br>Its sub element is<br>PNGWInfo<br>PNEInfo |
| PNID | 1 | A | String | PN Identification. |
| Description | 0 . . . 1 | A | String | PN Description. (e.g. Home, Office) |
| TempPN | 0 . . . 1 | A | Boolean | If this PN is temporary PN, this is "TRUE". If the physical connection between PNGW and all of PNEs is broken, this PN should be released automatically.<br>If this PN is sustained PN, this TempPN attribute is empty or "FALSE". |
| Sharing | 0 . . . 1 | A | Integer | The level of PN Inventory in PNE side<br>1 - Shared, PN GW Info and PNE Info are shared in PNE<br>2 - Protected, PN GW Info only in PNE |
| Disclosure | 0 . . . 1 | A | Integer | The willingness of openness of PN Information, in case Service Discovery is requested after PN Setup<br>1 - Blocked; PN information should not be unveiled.<br>2 - Open; PN information will be unveiled, when other CPNS Entities asks service discovery.<br>3 - Selective: PN can be unveiled, only when the authorized CPNS entity allows in case Service Discovery request contains PNID, PNEID or UserID |
| OwnershipEntityID | 0 . . . 1 | A | String | The ID of authorized CPNS Entity which has authorization to allow PN Information open, in case Service Discovery is requested. |
| PNGWInfo | 0 . . . 1 | E | | PN GW Information.<br>Its sub attributes are<br>PNGWID<br>PNGWName<br>Zonebasedservicesupport<br>Mode<br>Broadcastgroupkeydeliverysupport<br>PN Admin<br>Adminee |
| PNGWID | 1 | A | String | PN GW Identification. |
| PNGWName | 0 . . . 1 | A | String | PN GW Name (e.g. mobile phone, assigned nickname) |
| Zonebasedservicesupport | 0 . . . 1 | A | Boolean | If this CPNS entity is a capable PN GW of Zone Based Service, this value should be "TRUE". |
| Mode | 0 . . . 1 | A | Integer | The mode of current device<br>2 - PNGW, If the mode of device is PN GW, the value should be "PN GW".<br>3 - BOTH, If the mode of device is both of PNE and PN GW, the value should be "BOTH" (e.g. mobile phone) |
| Broadcastgroupkeydeliverysupport | 0 . . . 1 | A | Boolean | TRUE: PN GW supports broadcast Group Key delivery<br>FALSE: PN GW does not support broadcast Group Key delivery. |
| PNAdmin | 0 . . . 1 | A | Boolean | If this PN GW is PN Admin, it is "TRUE" |
| Adminee | 0 . . . 1 | A | Boolean | If this PN GW is Adminee, it is "TRUE" |
| PNEInfo | 0 . . . n | E | | PNE Information.<br>Its sub attribute are<br>PNEID<br>PNEName<br>Mode |

TABLE 2-continued

| Element | Cardinality | T | Data Type | Description |
|---|---|---|---|---|
| | | | | PN Admin Adminee |
| PNEID | 1 | A | String | PNE Identification. |
| PNEName | 0 . . . 1 | A | String | PNE Name (e.g. mp3 player, assigned nickname) |
| Mode | 0 . . . 1 | A | Integer | The mode of current device<br>1 - PNE, If the mode of device is PNE, the value should be "PNE".<br>3 - BOTH, If the mode of device is both of PNE and PN GW, the value should be "BOTH" (e.g. mobile phone) |
| PNAdmin | 0 . . . 1 | A | Boolean | If this PNE is PN Admin, it is "TRUE" |
| Adminee | 0 . . . 1 | A | Boolean | If this PNE is Adminee, it is "TRUE" |

The PNAdminRequest message may include a PNAdminCommand indicating a command related to a PN admin and PN information. The PNAdminCommand indicates the type of a PN operation related to the PN admin and may be expressed by an integer of 1 to 6. 1 indicates that a PN admin is assigned and indicates that a new PN admin is assigned in the PN. 2 indicates that a PN admin is released and indicates that a current PN admin of the PN is released. 3 indicates that an adminee is added. 4 indicates that an adminee is removed. 5 indicates that a PN admin is assigned and an adminee is added, that is, that a new PN admin is assigned and an adminee is added.

The PN information includes PNID, Description, TempPN, Sharing, Disclosure, OwnershipEntity ID, PNGWInfo and PNEInfo as components. PNID is PN identification and Description is a PN description (e.g., home, office, etc.). The value of TempPN is set to "TRUE" if the PN is a temporary PN and indicates that the PN should be automatically released if physical connections between PN GWs and all of PNEs are broken. Sharing indicates a level of a PN inventory of a PNE side, indicates "shared", that is, indicates that PN GW information and PNE information is shared in a PNE, when the value thereof is set to "1" and indicates "protected", that is, indicates that only PN GW information is shared in a PNE, when the value thereof is set to "2". Disclosure indicates a willingness of openness of PN information if service discovery is requested after PN setup and may have a value of Blocked, Open or Selective. OwnershipEntity ID indicates the ID of an authorized CPNS entity which has authorization to allow PN information open when service discovery is requested.

The PN GW information includes PNGWID, PGGWName, Zonebasedservicesupport, Mode, Broadcastgroupkeydeliverysupport, PNAdmin and Adminee as components. PNGWID is PN GW identification and PNGWName indicates a PN GW name (e.g., a nickname assigned by a user or device type). Zonebasedservicesupport indicates a PN GW supporting a zone based service. Mode is the mode of a current device, indicates a PN GW mode when the value thereof is set to "2" and indicates both PNE and PN GW modes (e.g., mobile phone) when the value thereof is set to "3". In addition, Broadcastgroupkeydeliverysupport indicates whether the PN GW supports broadcast group key delivery. The PNAdmin indicates whether the PN GW is a PN admin, which is set to "TRUE" when the PN GW is a PN admin, and Adminee indicates whether the PN GW is an adminee and is set to "TRUE" when the PN GW is an adminee.

The PNE information includes PNEID, PNEName, Mode, Description, PNAdmin, Adminee as components. PNEID is PNE identification and PNEName indicates a PNE name (e.g., a nickname assigned by a user). Mode is the mode of a current device, indicates a PNE mode when the value thereof is set to "1" and indicates both PNE and PN GW modes (e.g., mobile phone) when the value thereof is set to "3". Description is a description of a PN (e.g., home, office, etc.). PNAdmin indicates whether the PN GW is a PN admin and is set to "TRUE" when the PNE is a PN admin and Adminee indicates whether the PNE is an adminee and is set to "TRUE" when the PNE is an adminee.

Table 3 below shows information about a PNAdminResponse message used in the embodiments of the present invention.

TABLE 3

| Element | Cardinality | T | Data Type | Description |
|---|---|---|---|---|
| PNAdminResponse | 1 | E | | Its sub attribute is Result |
| Result | 1 | A | Integer | The status of success or fail.<br>1 - Success<br>2 - Fail, PN Admin assignment failed (e.g. PN Admin already exists or not enough Device capability)<br>3 - Fail, Adminee addition failed (e.g. PN Admin and Adminee are not belonging to the same User)<br>4 - Fail, requesting PN Admin is incorrect<br>5 - Fail, requested Adminee is incorrect |

The PNAdminResponse message includes a result (attributes). The result is expressed by an integer of 1 to 5. 1 indicates success, 2 indicates failure, that is, indicates that PN admin assignment has failed (e.g., a PN admin already exists or an entity, which has requested the PN admin, does not have enough device capabilities). 3 indicates failure, that is, that addition of an adminee has failed (e.g., a PN admin and an adminee do not belong to the same CPNS user), 4 indicates failure, that is, indicates that a requesting PN admin is incorrect and 5 indicates failure, that is, indicates that a requested adminee is incorrect.

Table 4 below shows information about a PNAdminNotification message used in the embodiments of the present invention. The PNAdminNotification message includes PN information as a component and a description thereof is equal to Table 2 above and thus will be omitted.

TABLE 4

| Element | Cardinality | T | Data Type | Description |
|---|---|---|---|---|
| PNAdminNotification | 1 | E | | Its sub element is PNInfo |
| PNInfo | 1 | E | | PN Information. Its sub attributes are PNID Description TempPN OwnershipEntityID Sharing Disclosure Its sub element is PNGWInfo PNEInfo |
| PNID | 1 | A | String | PN Identification. |
| Description | 0 . . . 1 | A | String | PN Description. |
| TempPN | 0 . . . 1 | A | Boolean | If this PN is temporary PN, this is "TRUE". If the physical connection between PNGW and all of PNEs is broken, this PN should be released automatically. If this PN is sustained PN, this TempPN attribute is empty or "FALSE". |
| OwnershipEntityID | 0 . . . 1 | A | String | The ID of authorized CPNS Entity which has authorization to allow PN Information open, in case Service Discovery is requested. |
| Sharing | 0 . . . 1 | A | Integer | The level of PN Inventory sharing in PNE side 1 - Shared, both PNGWInfo and PNEInfo in PNInfo are shared in PNE 2 - Protected, only PNGWInfo in PNInfo is shared in PNE. |
| Disclosure | 0 . . . 1 | A | Integer | The willingness of openness of PN Information, in case Service Discovery is requested after PN Setup 1 - Blocked; PN information should not be unveiled. 2 - Open; PN information will be unveiled, when other CPNS Entities asks service discovery. 3 - Selective: PN can be unveiled, only when the authorized CPNS entity allows in case Service Discovery request contains PNID, PNEID or UserID |
| PNGWInfo | 0 . . . 1 | E | | PN GW Information Its sub attributes are PNGWID PNGWName Mode Zonebasedservicesupport Broadcastgroupkeydeliverysupport PNAdmin Adminee |
| PNGWID | 1 | A | String | PN GW Identification. |
| PNGWName | 0 . . . 1 | A | String | PN GW Name (e.g. assigned nickname) |
| Mode | 0 . . . 1 | A | Integer | The mode of current device 2 - PNGW, If the mode of device is PN GW, the value should be "PN GW". 3 - BOTH, If the mode of device is both of PNE and PN GW, the value should be "BOTH" (e.g. mobile phone) |
| Zonebasedservicesupport | 0 . . . 1 | A | Boolean | If this CPNS entity is a capable PN GW of Zone Based Service, this value should be "TRUE". |
| Broadcastgroupkeydeliverysupport | 0 . . . 1 | A | Boolean | TRUE: PN GW supports broadcast Group Key delivery FALSE: PN GW does not support broadcast Group Key delivery. |
| PNAdmin | 0 . . . 1 | A | Boolean | If this PN GW is PNAdmin, it is "TRUE" |
| Adminee | 0 . . . 1 | A | Boolean | If this PN GW is Adminee, it is "TRUE" |
| PNEInfo | 0 . . . n | E | | PNE Information Its sub attributes are PNEID PNEName Mode PNAdmin Adminee |

TABLE 4-continued

| Element | Cardinality | T | Data Type | Description |
|---|---|---|---|---|
| PNEID | 1 | A | String | PNE Identification. |
| PNEName | 0 . . . 1 | A | String | PNE Name (e.g. mp3 player, assigned nickname) |
| Mode | 0 . . . 1 | A | Integer | The mode of device<br>1 - PNE, If the mode of device is PNE, the value should be "PNE".<br>3 - BOTH, If the mode of device is both of PNE and PN GW, the value should be "BOTH" (e.g. mobile phone) |
| PNAdmin | 0 . . . 1 | A | Boolean | If this PNE is PNAdmin, it is "TRUE" |
| Adminee | 0 . . . 1 | A | Boolean | If this PNE is Adminee, it is "TRUE" |

Table 5 below shows information components of a PN inventory. The PN inventory includes PN information as a component and a description thereof is equal to Table 2 above and thus will be omitted.

TABLE 5

| Element | Cardinality | T | Data Type | Description | S | G | P |
|---|---|---|---|---|---|---|---|
| PNInfo | 1 . . . n | E | | PN Information.<br>Its sub attributes are<br>PNID<br>Description<br>TempPN<br>Active<br>Sharing<br>Disclosure<br>OwnershipEntityID<br>Its sub elements are<br>PNGWInfo<br>PNEInfo | M | M | M |
| PNID | 1 | A | String | PN Identification. | M | M | M |
| Description | 0 . . . 1 | A | String | PN Description. | O | O | O |
| TempPN | 0 . . . 1 | A | Boolean | If this PN is temporary PN, this is "TRUE". If the physical connection between PNGW and all of PNEs is broken, this PN should be released automatically.<br>If this PN is sustained PN, this TempPN attribute is empty or "FALSE". | O | O | O |
| Active | 1 | A | Boolean | The active status of PN.<br>TRUE - This PN is active because at least one more member PNEs are physically connected.<br>FALSE - This PN is not active because all of member PNEs are disconnected. | M | M | M |
| Sharing | 1 | A | Integer | The level of PN Inventory sharing in PNE side<br>1 - Shared, both PNGWInfo and PNEInfo in PNInfo are shared in PNE<br>2 - Protected, only PNGWInfo in PNInfo is shared in PNE. | M | M | M |
| Disclosure | 1 | A | Integer | The willingness of openness of PN Information, in case Service Discovery is requested after PN Setup<br>1 - Blocked; PN information should not be unveiled.<br>2 - Open; PN information will be unveiled, when other CPNS Entities asks service discovery.<br>3 - Selective: PN can be unveiled, only when the authorized CPNS entity allows in case Service discovery request contains PNID, PNEID or UserID | M | M | M |

TABLE 5-continued

| Element | Cardinality | T | Data Type | Description | S | G | P |
|---|---|---|---|---|---|---|---|
| OwnershipEntityID | 0...1 | A | String | The ID of authorized CPNS Entity which has authorization to allow PN Information open, in case Service Discovery is requested. | O | | |
| PNGWInfo | 1 | E | | PN GW Information Its sub attributes are PNGWID PNGWName Mode Zonebasedservicesupport Broadcastgroupkeydeliverysupport PNAdmin Adminee | M | M | M |
| PNGWID | 1 | A | String | PN GW Identification. | M | M | M |
| PNGWName | 0...1 | A | String | PN GW Name (e.g. assigned nickname) | | O | O |
| Mode | 1 | A | Integer | The mode of current device 2 - PNGW, If the mode of device is PN GW, the value should be "PN GW". 3 - BOTH, If the mode of device is both of PNE and PN GW, the value should be "BOTH" (e.g. mobile phone) | | M | M |
| Zonebasedservicesupport | 0...1 | A | Boolean | If this CPNS entity is a capable PN GW of Zone Based Service, this value should be "TRUE". | O | O | O |
| Broadcastgroupkeydeliverysupport | 0...1 | A | Boolean | TRUE: PN GW supports broadcast Group Key delivery FALSE: PN GW does not support broadcast Group Key delivery. | O | M | M |
| PNAdmin | 0...1 | A | Boolean | If this PN GW is PN Admin in the PN, this value should be "TRUE" | O | O | O |
| Adminee | 0...1 | A | Boolean | If this PN GW is Adminee in the PN, this value should be "TRUE". | O | O | O |
| PNEInfo | 1...n | E | | PNE Information Its sub attributes are PNEID PNEName Active Mode PNAdmin Adminee Its sub elements are UserInfo DeviceCapa ServiceProfile | M | M | C |
| PNEID | 1 | A | String | PNE Identification. | M | M | C |
| Name | 0...1 | A | String | PNE Name (e.g. mp3 player) | O | O | O |
| Active | 1 | A | Boolean | The active status of PNE. TRUE - This PNE is active because PNE is physically connected. FALSE - This PNE is not active because PNE is physically disconnected. | M | M | C |
| Mode | 1 | A | Integer | The mode of current device 1 - PNE, If the mode of device is PNE, the value should be "PNE". 3 - BOTH, If the mode of device is both of PNE and PN GW, the value should be "BOTH" (e.g. mobile phone) | | M | C |
| PNAdmin | 0...1 | A | Boolean | If this PNE is PN Admin in the PN, this value should be "TRUE" | O | O | O |

TABLE 5-continued

| Element | Cardinality | T | Data Type | Description | S | G | P |
|---|---|---|---|---|---|---|---|
| Adminee | 0 . . . 1 | A | Boolean | If this PNE is Adminee in the PN, this value should be "TRUE". | O | O | O |
| UserInfo | 0 . . . 1 | E | — | Its attributes are UserID UserName | O | O | O |
| UserID | 1 | A | String | CPNS UserID | O | O | O |
| UserName | 0 . . . 1 | A | String | CPNS User Name | O | O | O |
| DeviceCapa | 0 . . . 1 | E | | Capability information of device embedding PNE Its sub attributes are UICapa Its sub element is ExternalCapa | O | O | O |
| UICapa | 0 . . . 1 | A | Boolean | If this device doesn't support UI functionalities, this value SHALL be set with "TRUE". TRUE: PN GW needs to support confirmation and/or Key assignment functionalities instead of PNE. | O | O | O |
| ExternalCapa | 0 . . . 1 | E | — | XML fragment contains information such as DeviceType, VideoCodec, etc. CPNS V1.0 can make use of the format of device capabilities from DPE Enabler specification. | O | O | O |
| ServiceProfile | 0 . . . 1 | E | | CPNS enabled application information to support certain service and status. Its sub elements are Service ContentInfo | O | O | O |

FIG. 9 is a block diagram showing an apparatus or server for implementing the embodiments of the present invention, that is, the above-described CPNS server, PNE and PN GW. For example, reference numeral 10 of FIG. 9 may correspond to a PNE, reference numeral 20 may correspond to a PN GW and reference numeral 30 may correspond to a CPNS server. Although only three entities are shown in FIG. 9, a larger number of PNEs and PN GWs may exist. The entities may include transceivers 11, 21 and 31, processors 12, 22 and 32 and memories 13, 23 and 33, respectively. The transceivers may be configured to perform communication with other entities, the processors may be configured to process messages or indications received via the transceivers and the memories may be configured to store received messages or processed results. These components are configured to implement the embodiments of the present invention related to FIGS. 3 to 8 and a detailed description thereof will be omitted herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The embodiments of the present invention are applicable to various apparatuses or servers configuring a network.

The invention claimed is:
1. A method for assigning a PN (personal network) admin and adding an adminee in a PN, the PN admin and the adminee belonging to the same user, the PN admin being authorized to administrate information about the adminee belonging to the same user, and the method being performed by a PN gateway (GW), the method comprising:
- transmitting, to a PN element (PNE), a first request message for requesting to add the PNE as an adminee and to assign a PN admin;
- receiving, from the PNE, a first response message including a result of processing the first request message;
- transmitting, to a converged personal network service (CPNS) server, a second request message equal to the first request message when the result of processing the first request message is successful, and a second request message for requesting to assign the PN admin when the result of processing the first request message is not successful;
- receiving, from the CPNS server, a second response message including a result of processing of the second request message; and
- updating a PN inventory with respect to addition of the adminee and assignment of the PN admin if the result of processing of the second request message is successful.

2. The method according to claim 1, wherein the first request message further includes information indicating an adminee to be added.

3. The method according to claim 1, wherein, when a PN admin does not exist in the PN and the PN GW has predetermined capabilities or more, the result of processing of the second request message is set to "successful" by the CPNS server.

4. The method according to claim 1, further comprising:
- transmitting, to a PNE to be added as an adminee, a fifth request message for requesting to add an adminee;
- receiving, from the PNE to be added, a fifth response message including a result of processing of the fifth request message;
- transmitting, to the CPNS server, a sixth request message equal to the fifth request message when the result of processing of the fifth request message is set to "successful";
- receiving, from the CPNS server, a sixth response message in response to the sixth request message; and
- updating the PN inventory with respect to addition of the adminee when the result included in the sixth response message is set to "successful".

5. The method according to claim 1, wherein, when the PN GW is a PN admin of the PN and the PNE, which has received the first request message, accepts the first request message, the result of processing of the first request message is set to "successful".

6. The method according to claim 1, further comprising transmitting, to PNEs of the PN, a notification message indicating the assignment of the PN admin or the addition of the adminee.

7. A method for assigning a PN (personal network) admin and adding an adminee in a PN, the PN admin and the adminee belonging to the same user, the PN admin being authorized to administrate the information about the adminee belonging to the same user, and the method being performed by a PN element (PNE), the method comprising:
- transmitting, to a PN gateway (GW), a first request message for requesting to add an adminee and to assign a PN admin;
- receiving, from the PN GW, a first response message including a result of processing of the first request message; and
- updating a PN inventory with respect to addition of the adminee and assignment of the PN admin when the result of processing of the first request message is successful, wherein the first request message is forwarded by the PN GW, to the CPNS server, when the result of processing of the first request message is successful, and
- a second request message is transmitted by the PN GW, to the CPNS server, for requesting to assign the PN admin when the result of processing of the first request message is not successful.

8. The method according to claim 7, wherein the first request message further includes information indicating the adminee to be added.

9. The method according to claim 7, wherein, when a PN admin does not exist in the PN and the PNE has predetermined capabilities or more, the result of processing of the second request message is set to "successful" by a converged personal network service (CPNS) server.

10. The method according to claim 7, further comprising:
- transmitting, to the PN GW, a third request message for requesting to add an adminee, the third request message including attributes indicating the adminee;
- receiving, from the PN GW, a third response message including a result of processing of the third request message; and
- updating the PN inventory with respect to addition of the adminee when the result of processing of the third request message is successful.

11. The method according to claim 7, wherein, when the PNE is a PN admin of the PN and the PNE, which has received the first request message, accepts the first request message, the result of processing of the first request message is set to "successful".

12. The method according to claim 7, further comprising transmitting, to other PNEs of the PN, a notification message indicating the assignment of the PN admin or the addition of the adminee.

13. The method according to claim 4, wherein, when the PN GW is a PN admin of the PN and the PNE, which has received the fifth request message, accepts the fifth request message, the result of processing of the fifth request message is set to "successful".

14. The method according to claim 4, further comprising transmitting, to PNEs of the PN, a notification message indicating the assignment of the PN admin or the addition of the adminee.

15. The method according to claim 10, wherein, when the PNE is a PN admin of the PN and the PNE, which has received the third request message, accepts the third request message, the result of processing of the third request message is set to "successful".

16. The method according to claim 10, further comprising transmitting, to other PNEs of the PN, a notification message indicating the assignment of the PN admin or the addition of the adminee.

* * * * *